United States Patent
Doi et al.

(10) Patent No.: US 6,580,843 B2
(45) Date of Patent: Jun. 17, 2003

(54) OPTICAL DEVICE

(75) Inventors: Masaharu Doi, Kawasaki (JP); Shinji Taniguchi, Kawasaki (JP); Masaaki Ohyama, Kawasaki (JP); Masaaki Norimatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 10 days.

(21) Appl. No.: 09/826,089

(22) Filed: Apr. 5, 2001

(65) Prior Publication Data

US 2002/0146190 A1 Oct. 10, 2002

(51) Int. Cl.$^7$ .................................................. G02B 6/12
(52) U.S. Cl. .......................................................... 385/14
(58) Field of Search .............................. 385/14, 39, 40, 385/45, 129, 130, 131

(56) References Cited

U.S. PATENT DOCUMENTS

| | | | | |
|---|---|---|---|---|
| 5,563,965 A | * | 10/1996 | Madabhushi | 385/2 |
| 5,790,719 A | * | 8/1998 | Mitomi et al. | 385/2 |
| 5,841,568 A | * | 11/1998 | Miyakawa | 359/245 |
| 5,901,265 A | * | 5/1999 | Tohyama et al. | 385/131 |
| 5,949,944 A | * | 9/1999 | Minford et al. | 385/131 |
| 6,356,673 B1 | * | 3/2002 | Burns | 385/2 |
| 6,384,955 B2 | * | 5/2002 | Tada et al. | 359/248 |
| 6,400,490 B1 | * | 6/2002 | Hosoi | 359/254 |

FOREIGN PATENT DOCUMENTS

| JP | 3-229214 | 10/1991 |
|---|---|---|
| JP | 4-288518 | 10/1992 |

OTHER PUBLICATIONS

Doi, M., et al., "Clock Modulator Integrated LiNbO$_3$ RS Modulator," Proceedings of the 2000 IEICE General Conference, Mar. 7, 2000, C–3–23, p. 202, with full English translation.

Doi, M., et al., 40 GB/s LiNbO$_3$ Modulator, Technical Report of the IEICE, vol. 100, No. 234, Jul. 28, 2000, pp. 44–48, with full English translation.

* cited by examiner

Primary Examiner—Lynn D. Feild
Assistant Examiner—Thanh-Tam Le
(74) Attorney, Agent, or Firm—Staas & Halsey LLP

(57) ABSTRACT

The invention provides an optical device which can lower the drive voltage which is used as one of the parameters for performance evaluation of the optical device. The optical device includes a substrate having first and second ridges, first and second grooves, a third groove, and first and second banks formed thereon, a Mach-Zehnder optical waveguide formed on the substrate, and an electrode set including first and second signal electrodes and a grounding electrode for controlling light which propagates in the optical waveguide. The grounding electrode extends to the first groove adjacent to the first bank and the second groove adjacent to the second bank. The optical device is applied, for example, to a transmission side apparatus for a long distance optical transmission system.

59 Claims, 27 Drawing Sheets

F I G. 2
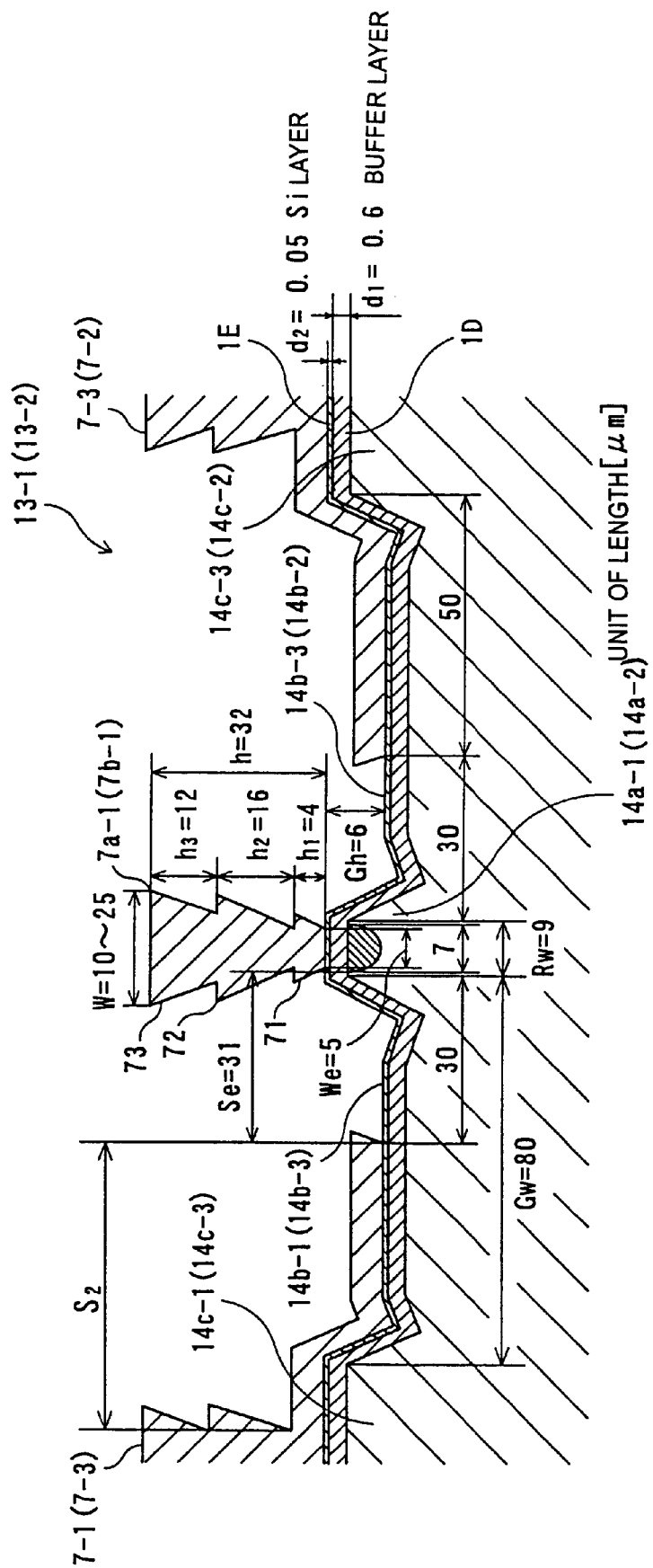

GLASS SUBSTRATE (LOW DIELECTRIC CONSTANT)

IS ADHERED FOR REINFORCEMENT

ELECTRIC CLOCK SIGNAL (20 GHz)

OPTICAL CLOCK SIGNAL (40 GHz)

ELECTRIC, OPTICAL NRZ SIGNAL (40 GHz)

OPTICAL RZ SIGNAL (40 GHz)

ns

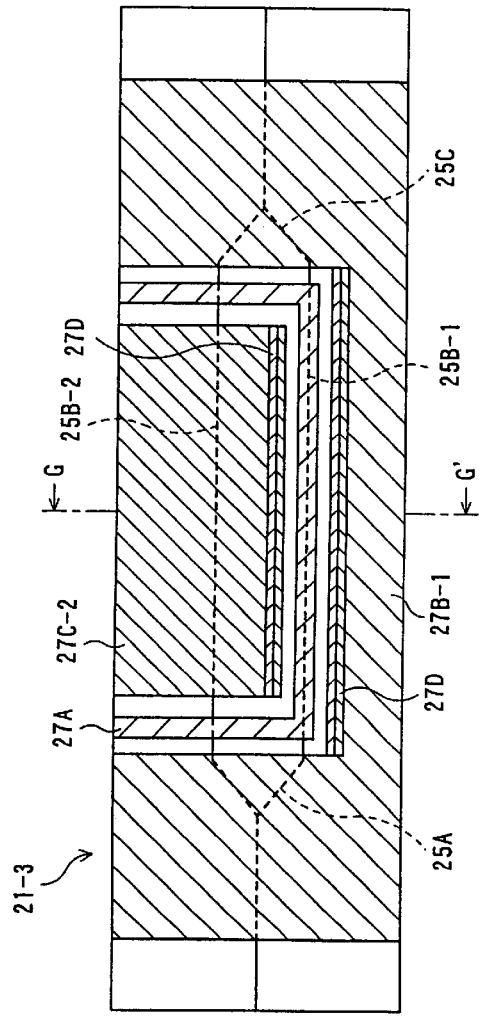
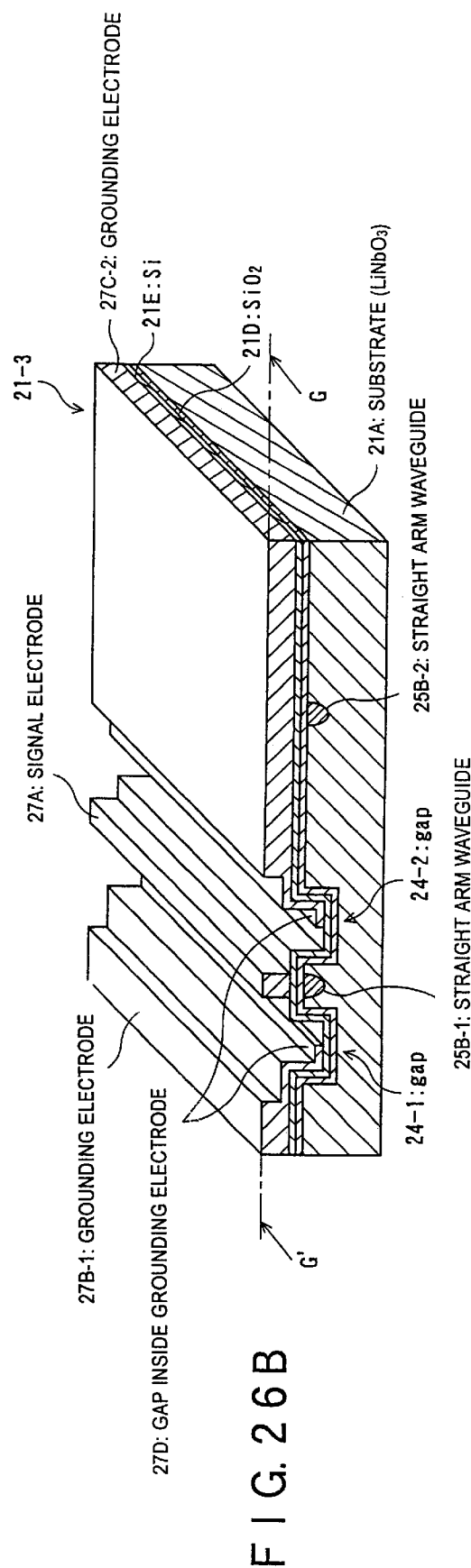
FIG. 26A
FIG. 26B

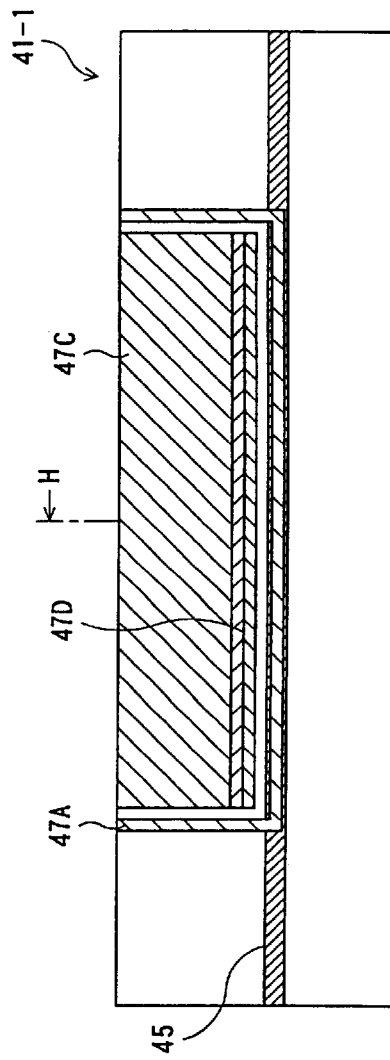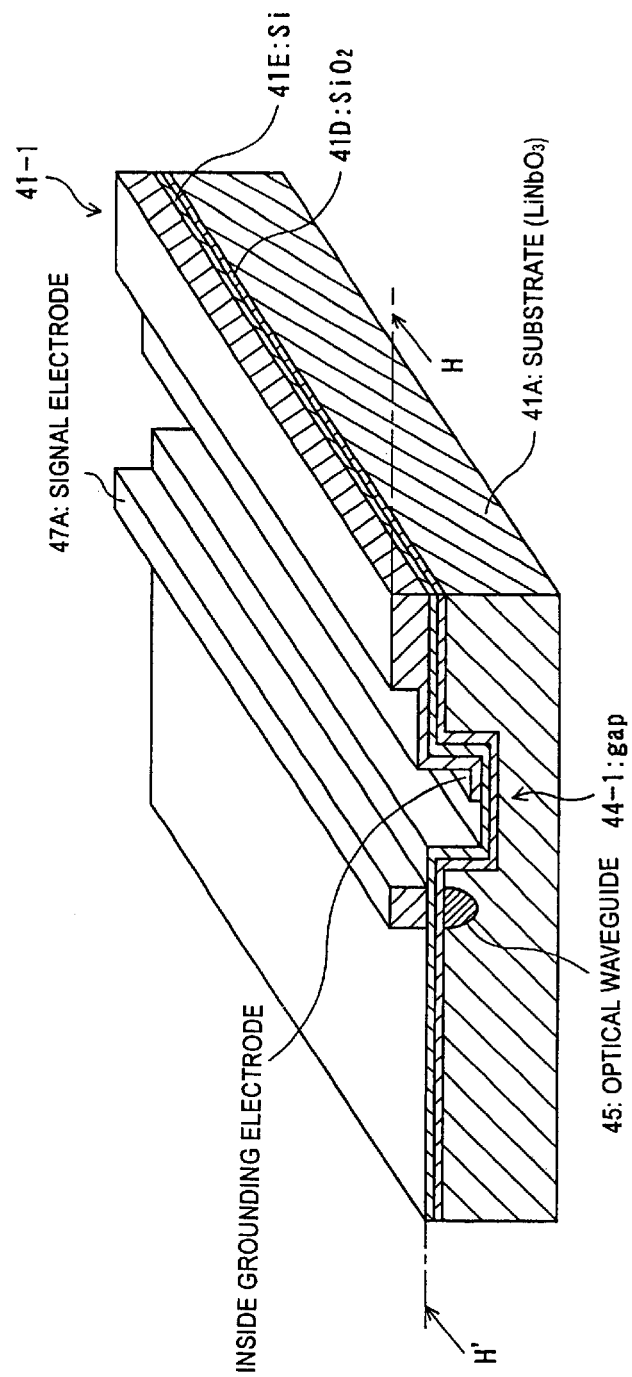
FIG. 27A
FIG. 27B

OPTICAL DEVICE

BACKGROUND OF THE INVENTION

1) Field of the Invention

This invention relates to an optical modulator suitable for use in the field of long distance optical communication systems.

2) Description of the Related Art

As data transmission rates have increased in recent years, optical modulators for modulating a data signal from an electric signal into an optical signal are being developed energetically in the field of long distance communication systems such as submarine optical communication.

An example of an optical modulators as just described is dual drive optical modulator 30 as shown in FIG. 22. Referring to FIG. 22, the dual drive optical modulator 30 shown includes a substrate 31 on which a Mach-Zehnder optical waveguide 32 is formed, and an electrode 33 formed integrally on the substrate 31 and including two signal electrodes 33A-1 and 33A-2 and a grounding electrode 33B. The dual drive optical modulator 30 modulates incoming light from a light source not shown with an NRZ data signal.

FIG. 23 is a sectional view taken along line A–A' of the dual drive optical modulator 30 shown in FIG. 22. As seen in FIG. 23, the dual drive optical modulator 30 is configured such that the electrode 33 is integrally formed on the substrate 31, which is made of, for example, lithium niobate ($LiNbO_3$) and cut in the Z-axis direction of the crystal orientation (Z-axis cut), together with the Mach-Zehnder optical waveguide 32.

The Mach-Zehnder optical waveguide 32 is formed by thermal diffusion of titanium (Ti) or a like substance on the substrate 31 and includes a Y branching waveguide 32A and two straight arm waveguides 32B-1 and 32B-2 on the light incoming side and a Y branching waveguide 32C on the light outgoing side.

The electrode 33 is formed partially on the substrate 31 with a buffer layer 35 (refer to FIG. 23) interposed therebetween and includes the two signal electrodes 33A-1 and 33A-2 and the grounding electrode 33B.

The electrode 33 can modulate incoming light into an NRZ optical signal by applying NRZ data signals from NRZ data signal generators 34A and 34B which are hereinafter described as electric signals to the signal electrodes 33A-1 and 33A-2.

As shown in FIG. 22, the signal electrodes 33A-1 and 33A-2 are each formed so as to establish an electric connection between two connector contacts on a one-side edge portion of the substrate 31 in its widthwise direction. Further, the signal electrode 33A-1 is formed such that part of it extends along and above the portion at which the straight arm waveguide 32B-1 is formed. Further, the grounding electrode 33B is formed such that it is disposed on the opposite sides of the signal electrodes 33A-1 and 33A-2 in a spaced relationship by a predetermined distance thereby to form a coplanar line on the substrate 31.

The NRZ data signal generator 34A applies a voltage signal (microwave) as an NRZ data signal to the signal electrodes 33A (33A-1 and 33A-2). The NRZ data signal generator 34B applies a voltage signal (microwave) as an NRZ data signal to the signal electrode 33B.

When light from a light source (not shown) is introduced into the dual drive optical modulator 30 having the configuration described above with reference to FIG. 22, while the light propagates in the Mach-Zehnder optical waveguide 32, it is modulated into an NRZ optical signal by the signal electrodes 33A-1 and 33A-2 to which a voltage signal (microwave) of NRZ data or the like is applied.

In order to design an optical device for which high speed operation is required such as an optical modulator described above, it is necessary as a basic design item to take several parameters into consideration including (1) the drive voltage, (2) the velocity match between the optical signal and the electric signal, (3) the attenuation constant of the electric signal, (4) the characteristic impedance (normally 50 Ω), (5) the wavelength chirp amount, and (6) the loss. Particularly, it is important for improvement in power consumption and transmission quality of the apparatus to lower the drive voltage of the optical device.

Where such a dual drive optical modulator as described above is used to modulate a voltage signal into a data optical signal of a transmission rate particularly of 10 Gb/s or more, preferably of approximately 40 Gb/s, it is a significant subject for improvement of the transmission quality to lower the drive voltage while arbitrating with the values of the other evaluation parameters such as the velocity match between the optical signal and the electric signal as described above.

SUMMARY OF THE INVENTION

It is an object of the present invention to provide an optical device which can lower the drive voltage which is used as one of the parameters for performance evaluation of the optical device.

In order to attain the objective described above, according to an aspect of the present invention, there is provided an optical device, comprising a substrate having an electro-optical effect and having formed thereon first and second ridges which extend in parallel to each other, first and second grooves which are positioned on the outer sides of the first and second ridges, respectively, a third groove which is positioned between the first and second ridges, and first and second banks which are positioned on the outer sides of the first and second grooves, respectively, a Mach-Zehnder optical waveguide formed on the substrate such that the Mach-Zehnder optical waveguide branches at a first Y branching waveguide into a first arm waveguide included in the first ridge and a second arm waveguide included in the second ridge and then joins together at a second Y branching waveguide, and electrode means formed on the substrate and including a first signal electrode formed on the first ridge, a second signal electrode formed on the second ridge and a grounding electrode formed on the first and second banks and the third groove for controlling light which propagates in the optical waveguide, the grounding electrode extending to the first groove adjacent to the first bank and the second groove adjacent to the second bank.

In the optical device, while incoming light propagates in the optical waveguide, an electric signal is applied to the electrode means to control the light which propagates in the optical waveguide. Since the grounding electrode which is a component of the electrode means extends to the first groove adjacent to the first bank and the second groove adjacent to the second bank, the drive voltage of the electric signal to be applied to the electrode means is lowered.

Accordingly, with the optical device, since the grounding electrode extends to the first groove adjacent to the first bank and the second groove adjacent to the second bank, the amplitude values of the voltages (drive voltages) to be applied to the first and second signal electrodes can be reduced while maintaining a favorable modulation performance. Consequently, the optical device is advantageous in that the transmission quality can be improved, power can be saved, and the performance of the optical modulator can be improved.

Preferably, in the optical device, a third bank is formed at a middle position between the first and second ridges in the third groove. In this instance, the grounding electrode may extend to the third groove adjacent to the opposite sides of the third bank, and the ridges may have a top face level substantially equal to that of the banks.

In the optical device, preferably the substrate is made of $LiNbO_3$. The substrate made of $LiNbO_3$ may be Z-axis cut. The ridges may have a top face level substantially equal to that of the banks. The grooves may have depths set substantially equal to each other.

In the optical device, preferably the signal electrodes contact with the respective corresponding ridges with a contact width smaller than the width of the ridges. Preferably, a buffer layer is formed between the substrate and the electrode means. The buffer layer may be formed in such a manner as to trace the shapes of the first, second and third grooves, or may be provided also in the first, second and third grooves and have, in the grooves, a thickness smaller than the thickness of a portion of the buffer layer which is present at any other location.

In the optical device, preferably an NRZ data signal generator for supplying an NRZ data signal is connected to the electrode means. A pad for external apparatus connection may be provided at each end portion of the electrode means and have a width equal to or smaller than 70 microns.

Another electrode may be provided at the second Y branching waveguide. In this instance, preferably a DC power supply is connected to the other electrode. A pad for external apparatus connection may be provided at each end portion of the other electrode and have a width equal to or smaller than 70 microns.

According to a second aspect of the present invention, there is provided an optical device, comprising a Z-axis cut substrate made of $LiNbO_3$ and having formed thereon first and second ridges which extend in parallel to each other, first and second grooves which are positioned on the outer sides of the first and second ridges, respectively, a third groove which is positioned between the first and second ridges, and first and second banks which are positioned on the outer sides of the first and second grooves, respectively, a Mach-Zehnder optical waveguide formed on the substrate such that the Mach-Zehnder optical waveguide branches at a first Y branching waveguide into a first arm waveguide included in the first ridge and a second arm waveguide included in the second ridge and then joins together at a second Y branching waveguide, and electrode means formed on the substrate and including a first signal electrode formed on the first ridge, a second signal electrode formed on the second ridge and a grounding electrode formed on the first and second banks and the third groove for controlling light which propagates in the optical waveguide, a buffer layer being formed between the substrate and the electrode means, the grounding electrode extending to the first groove adjacent to the first bank and the second groove adjacent to the second bank.

Accordingly, with the optical device, since the grounding electrode extends to the first groove adjacent to the first bank and the second groove adjacent to the second bank, the amplitude values of the voltages (drive voltages) to be applied to the first and second signal electrodes can be reduced while maintaining a favorable modulation performance similar to the optical device according to the first aspect of the present invention. Consequently, the optical device is advantageous in that the transmission quality can be improved, power can be saved, and the performance of the optical modulator can be improved.

Further, the absorption loss of light propagating in the optical waveguide can be suppressed and the transmission quality can be improved by the buffer layer. Furthermore, since the substrate is made of $LiNbO_3$ and Z-axis cut, the optical device is advantageous also in that four of the performance evaluation parameters upon configuration of a high speed optical modulator, that is, the drive voltage, the velocity match between the optical signal and the electric signal, the attenuation constant of the electric signal, and the characteristic impedance (50 $\Omega$), can be matched readily.

According to a third aspect of the present invention, there is provided an optical device, comprising a substrate having an electro-optical effect and having formed thereon first and second ridges which extend in parallel to each other, first and second grooves which are positioned on the outer sides of the first and second ridges, respectively, a third groove which is positioned between the first and second ridges, first and second banks which are positioned on the outer sides of the first and second grooves, respectively, and a third bank which is positioned intermediately between the first and second ridges in the third groove in such a manner as to divide the third groove, a Mach-Zehnder optical waveguide formed on the substrate such that the Mach-Zehnder optical waveguide branches at a first Y branching waveguide into a first arm waveguide included in the first ridge and a second arm waveguide included in the second ridge and then joins together at a second Y branching waveguide, and electrode means formed on the substrate and including a first signal electrode formed on the first ridge, a second signal electrode formed on the second ridge and a grounding electrode formed on the first, second and third banks for controlling light which propagates in the optical waveguide, the grounding electrode extending to the third groove adjacent to the opposite sides of the third bank.

Accordingly, with the optical devices since the grounding electrode extends to the third groove adjacent to the opposite sides of the third bank, the amplitude values of the voltages (drive voltages) to be applied to the first and second signal electrodes can be reduced while maintaining a favorable modulation performance similarly to the optical device according to the first aspect of the present invention. Consequently, the optical device is advantageous in that the transmission quality can be improved and the power can be saved and besides the performance of the optical modulator can be improved.

Preferably, the substrate is made of $LiNbO_3$, and the substrate made of $LiNbO_3$ is Z-axis cut.

In the optical device, preferably the ridges have a top face level substantially equal to that of the banks, and the grooves have depths set substantially equal to each other.

In the optical device, preferably the signal electrodes contact with the respective corresponding ridges with a contact width smaller than the width of the ridges, and a buffer layer is formed between the substrate and the electrode means. The buffer layer may be formed in such a manner as to trace the shapes of the first, second and third grooves, or may be provided also in the first, second and third grooves and have, in the grooves, a thickness smaller than the thickness of a portion of the buffer layer which is present at any other location.

An NRZ data signal generator for supplying an NRZ data signal may be connected to the electrode means. Preferably, a pad for external apparatus connection is provided at each end portion of the electrode means and has a width equal to or smaller than 70 microns.

Another electrode may be provided at the second Y branching waveguide. Preferably, a DC power supply is connected to the other electrode. Further, preferably a pad for external apparatus connection is provided at each end portion of the other electrode and has a width equal to or smaller than 70 microns.

According to a fourth aspect of the present invention, there is provided an optical device, comprising a Z-axis cut substrate made of $LiNbO_3$ and having formed thereon first and second ridges which extend in parallel to each other, first and second grooves which are positioned on the outer sides of the first and second ridges, respectively, a third groove which is positioned between the first and second ridges, first and second banks which are positioned on the outer sides of the first and second grooves, respectively, and a third bank which is positioned intermediately between the first and second ridges in the third groove in such a manner as to divide the third groove, a Mach-Zehnder optical waveguide formed on the substrate such that the Mach-Zehnder optical waveguide branches at a first Y branching waveguide into a first arm waveguide included in the first ridge and a second arm waveguide included in the second ridge and then joins together at a second Y branching waveguide, and electrode means formed on the substrate and including a first signal electrode formed on the first ridge, a second signal electrode formed on the second ridge and a grounding electrode formed on the first, second and third banks for controlling light which propagates in the optical waveguide, a buffer layer being formed between the substrate and the electrode means, the grounding electrode extending to the first groove adjacent to the first bank, the second groove adjacent to the second bank and the third groove adjacent to the opposite sides of the third bank.

Accordingly, with the optical device, since the grounding electrode extends to the third groove adjacent to the opposite sides of the third bank, the amplitude values of the voltages (drive voltages) to be applied to the first and second signal electrodes can be reduced while maintaining a favorable modulation performance similar to the optical device according to the first aspect of the present invention. Consequently, the optical device is advantageous in that the transmission quality can be improved, power can be saved, and the performance of the optical modulator can be improved.

Further, the absorption loss of light propagating in the optical waveguide can be suppressed and the transmission quality can be improved by the buffer layer. Furthermore, since the substrate is made of $LiNbO_3$ and Z-axis cut, the optical device is advantageous also in that four of the performance evaluation parameters upon configuration of a high speed optical modulator, that is, the drive voltage, the velocity match between the optical signal and the electric signal, the attenuation constant of the electric signal, and the characteristic impedance (50 Ω), can be matched readily.

According to a fifth aspect of the present invention, there is provided an optical device, comprising a Mach-Zehnder first optical modulator including a first substrate having an electro-optical effect, a Mach-Zehnder first optical waveguide formed on the first substrate, and first electrode means formed on the first substrate for controlling light which propagates in the first optical waveguide, a Mach-Zehnder second optical modulator connected in cascade connection to the Mach-Zehnder first optical modulator and including a second substrate having an electro-optical effect, a Mach-Zehnder second optical waveguide formed on the second substrate and connected to the first optical waveguide, and second electrode means formed on the second substrate for controlling light which propagates in the second optical waveguide, a clock generator connected to a first one of the first and second electrode means for applying a clock signal to the first one of the first and second electrode means to produce an RZ signal, and an NRZ data signal generator connected to a second one of the first and second electrode means for supplying an NRZ data signal to the second one of the first and second electrode means, at least one of the Mach-Zehnder first optical modulator and the Mach-Zehnder second optical modulator being formed as an optical device having the characteristics of the optical device according to the first aspect of the present invention.

With the optical device, since at least one of the Mach-Zehnder first optical modulator and the Mach-Zehnder second optical modulator is formed so as to have the characteristics of the optical device according to the first aspect of the present invention described above, the amplitude values of the voltages (drive voltages) to be applied to the first and second signal electrodes can be reduced while maintaining a favorable modulation performance. Consequently, the optical device is advantageous in that the transmission quality can be improved, power can be saved, and the performance of the optical modulator can be improved.

Preferably, the first and second substrates are formed from a common substrate, and the Mach-Zehnder first optical modulator and the Mach-Zehnder second optical modulator are integrated as a unitary member. Further, preferably the substrate is made of $LiNbO_3$, and the substrate made of $LiNbO_3$ is Z-axis cut.

The optical device may be constructed such that one of the Mach-Zehnder first optical modulator and the Mach-Zehnder second optical modulator is formed as an optical device having the characteristics of the optical device according to the first aspect of the present invention while the electrode means of the other of the Mach-Zehnder first optical modulator and the Mach-Zehnder second optical modulator includes a signal electrode and a grounding electrode, and the grounding electrodes of the Mach-Zehnder first optical modulator and the Mach-Zehnder second optical modulator are formed as a common grounding electrode.

Alternatively, the optical device may be constructed such that one of the Mach-Zehnder first optical modulator and the Mach-Zehnder second optical modulator is formed as an optical device having the characteristics of the optical device according to the first aspect of the present invention while the electrode means of the other of the Mach-Zehnder first optical modulator and the Mach-Zehnder second optical modulator is formed as a dual electrode having two signal electrodes or as a single electrode having a single signal electrode.

Further, the optical device may be constructed such that the clock generator applies a clock signal of a frequency equal to one half the transmission rate of output light of the optical device per unit time to one of the first and second electrodes to produce an RZ signal of a transmission rate equal to the transmission rate of output light of the optical device per unit time. In this instance, preferably the transmission rate of output light of the optical device per unit time is at the lowest higher than 10 gigabits per second and the clock signal has a frequency equal to or higher than 5 gigahertz.

Alternatively, the optical device may be constructed such that the clock generator applies a clock signal of a frequency equal to the transmission rate of output light of the optical device per unit time to one of the first and second electrodes to produce an RZ signal of a transmission rate equal to the transmission rate of output light of the optical device per unit time. In this instance, preferably the transmission rate of output light of the optical device per unit time is at the lowest higher than 10 gigabits per second and the clock signal has a frequency equal to or higher than 10 gigahertz.

Preferably, the grounding electrode has a cutaway portion formed therein and light loss reduction means for reducing the loss of light propagated is formed on a connection path between the Mach-Zehnder first optical modulator and the Mach-Zehnder second optical modulator.

According to a sixth aspect of the present invention, there is provided an optical device, comprising a Mach-Zehnder first optical modulator including a first substrate having an electro-optical effect, a Mach-Zehnder first optical waveguide formed on the first substrate, and first electrode means formed on the first substrate for controlling light which propagates in the first optical waveguide, a Mach-Zehnder second optical modulator connected in cascade connection to the Mach-Zehnder first optical modulator and including a second substrate having an electro-optical effect, a Mach-Zehnder second optical waveguide formed on the second substrate and connected to the first optical waveguide, and second electrode means formed on the second substrate for controlling light which propagates in the second optical waveguide, a clock generator connected to a first one of the first and second electrode means for applying a clock signal to the first one of the first and second electrode means to produce an RZ signal, and an NRZ data signal generator connected to a second one of the first and second electrode means for supplying an NRZ data signal to the second one of the first and second electrode means, at least one of the Mach-Zehnder first optical modulator and the Mach-Zehnder second optical modulator being formed as an optical device having the characteristics of the optical device according to the third aspect of the present invention.

With the optical device, since at least one of the Mach-Zehnder first optical modulator and the Mach-Zehnder second optical modulator is formed so as to have the characteristics of the optical device according to the third aspect of the present invention described above, the amplitude values of the voltages (drive voltages) to be applied to the first and second signal electrodes can be reduced while maintaining a favorable modulation performance. Consequently, the optical device is advantageous in that the transmission quality can be improved and the power can be saved and besides the performance of the optical modulator can be improved.

Preferably, the first and second substrates are formed from a common substrate, and the Mach-Zehnder first optical modulator and the Mach-Zehnder second optical modulator are integrated as a unitary member. Further, preferably the substrate is made of $LiNbO_3$, and the substrate made of $LiNbO_3$ is Z-axis cut.

The optical device may be constructed such that one of the Mach-Zehnder first optical modulator and the Mach-Zehnder second optical modulator is formed as an optical device having the characteristics of the optical device according to the third aspect of the present invention while the electrode means of the other of the Mach-Zehnder first optical modulator and the Mach-Zehnder second optical modulator includes a signal electrode and a grounding electrode, and the grounding electrodes of the Mach-Zehnder first optical modulator and the Mach-Zehnder second optical modulator are formed as a common grounding electrode.

Further, the optical device may be constructed such that one of the Mach-Zehnder first optical modulator and the Mach-Zehnder second optical modulator is formed as an optical device having the characteristics of the optical device according to the third aspect of the present invention while the electrode means of the other of the Mach-Zehnder first optical modulator and the Mach-Zehnder second optical modulator is formed as a dual electrode having two signal electrodes or as a single electrode having a single signal electrode.

The optical device may be constructed also such that the clock generator applies a clock signal of a frequency equal to one half the transmission rate of output light of the optical device per unit time to one of the first and second electrodes to produce an RZ signal of a transmission rate equal to the transmission rate of output light of the optical device per unit time. In this instance, preferably the transmission rate of output light of the optical device per unit time is at the lowest higher than 10 gigabits per second and the clock signal has a frequency equal to or higher than 5 gigahertz.

Alternatively, the optical device may be constructed such that the clock generator applies a clock signal of a frequency equal to the transmission rate of output light of the optical device per unit time to one of the first and second electrodes to produce an RZ signal of a transmission rate equal to the transmission rate of output light of the optical device per unit time. In this instance, preferably the transmission rate of output light of the optical device per unit time is at the lowest higher than 10 gigabits per second and the clock signal has a frequency equal to or higher than 10 gigahertz.

Preferably, the grounding electrode has a cutaway portion formed therein and light loss reduction means for reducing the loss of light propagated is formed on a connection path between the Mach-Zehnder first optical modulator and the Mach-Zehnder second optical modulator.

According to a seventh aspect of the present invention, there is provided an optical device, comprising a substrate having an electro-optical effect, a single optical waveguide formed on a surface of the substrate, means for defining a groove provided on the surface of the substrate in the proximity of the optical waveguide, a signal electrode provided on the optical waveguide, and a grounding electrode provided in the groove.

With the optical device, the amplitude value of the voltage to be applied to the signal electrode can be reduced by the grounding electrode. Therefore, the optical device is advantageous in that the power consumption required to drive the signal electrode can be reduced, operation cost of the optical communication system in which the optical device is incorporated can be reduced, and the performance of the device can be improved.

According to an eighth aspect of the present invention, there is provided an optical device, comprising a substrate having an electro-optical effect, a pair of optical waveguides formed on a surface of the substrate, means for defining a plurality of grooves provided on the surface of the substrate in the proximity of the pair of optical waveguides, a signal electrode provided on the pair of optical waveguides, and a grounding electrode provided in the plurality of grooves.

With the optical device, the amplitude value of the voltage to be applied to the signal electrode can be reduced by the grounding electrode. Therefore, the optical device is advantageous in that the power consumption required to drive the signal electrode can be reduced, operation cost of the optical communication system in which the optical device is incorporated can be reduced, and the performance of the device can be improved.

The above and other objects, features and advantages of the present invention will become apparent from the following description and the appended claims, taken in conjunction with the accompanying drawings.

BRIEF DESCRIPTION OF THE DRAWINGS

FIGS. 1 and 2 are schematic views showing cross sectional structures of an optical device according to different embodiments of the present invention;

FIG. 26A is a top plan view showing an arrangement configuration of a Mach-Zehnder interferometer according to a second modification to the fifth embodiment, and FIG. 26B is a perspective view showing, partly in section, the Mach-Zehnder interferometer shown in FIG. 26A and particularly showing a cross section taken along line G–G' of FIG. 26A;

FIG. 27A is a top plan view showing an arrangement configuration of a phase modulator as an optical device according to a sixth embodiment of the present invention, and FIG. 27B is a perspective view showing, partly in section, the phase modulator shown in FIG. 27A and particularly showing a cross section taken along line H–H' of FIG. 27A;

DESCRIPTION OF THE PREFERRED EMBODIMENTS a. First Embodiment

Figure 3:
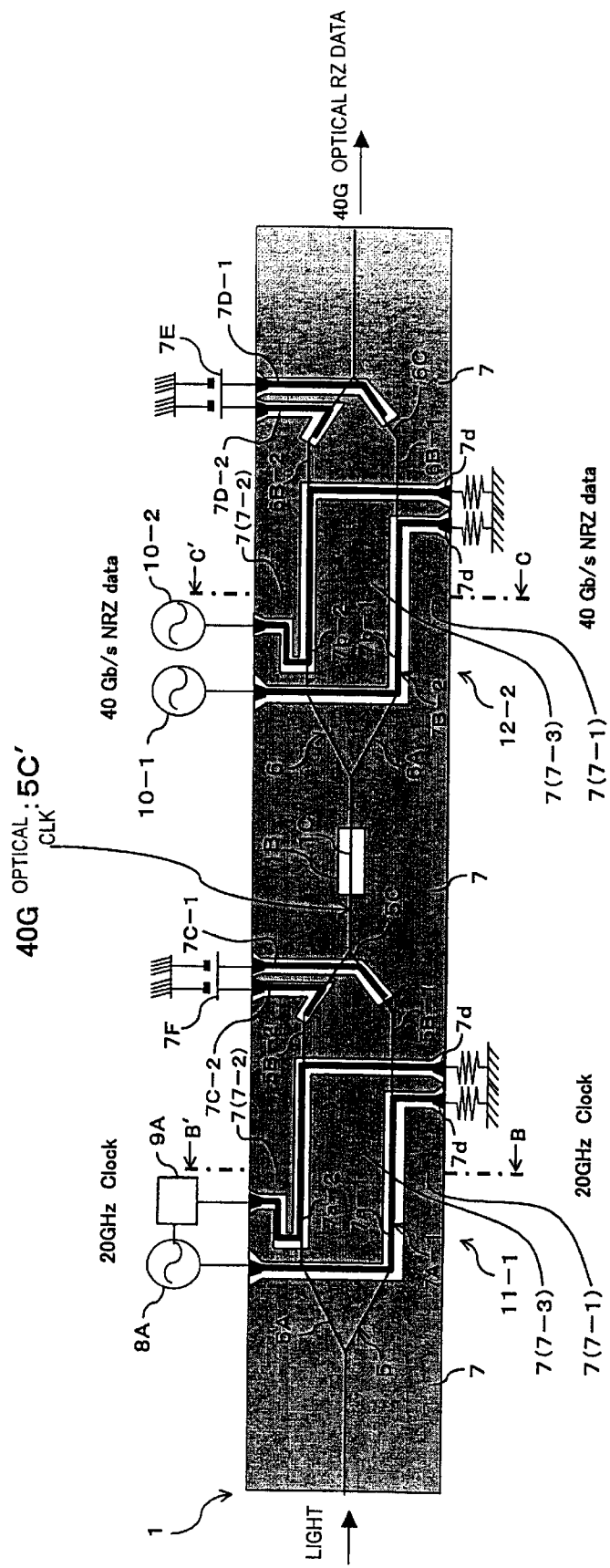
FIG. 3 is a schematic view showing an optical device according to a first embodiment of the present invention.

FIG. 3 is a schematic view showing an optical device 1 as an optical device according to a first embodiment of the present invention. Referring to FIG. 3, the optical device 1 shown is used, for example, with a transmission side apparatus of a long distance optical transmission system and functions as an optical modulator which modulates light from a light source (semiconductor laser) not shown with a transmission data signal. The modulated optical signal is transmitted to the reception side through an optical fiber or the like also not shown.

The optical device 1 includes a Mach-Zehnder first optical waveguide 5, a Mach-Zehnder second optical waveguide 6, a first electrode 7A-1, and a second electrode 7B-1 formed on a substrate 1A, which is made of lithium niobate ($LiNbO_3$) and cut in the Z-axis direction of the crystal orientation (Z-axis cut) and has an electro-optical effect.

It is to be noted that, in FIG. 3, also portions of the optical waveguides which are covered with a grounding electrode are indicated by solid lines.

An optical modulator 11-1 is formed from the substrate 1A, the Mach-Zehnder first optical waveguide 5 and the first electrode 7A-1 while another optical modulator 12-2 is formed from the substrate 1A common to the optical modulator 11-1, the Mach-Zehnder second optical waveguide 6 and the second electrode 7B-2. In other words, the two optical modulators 11-1 and 12-1 are integrally formed as a unitary member in one chip.

Figure 4:
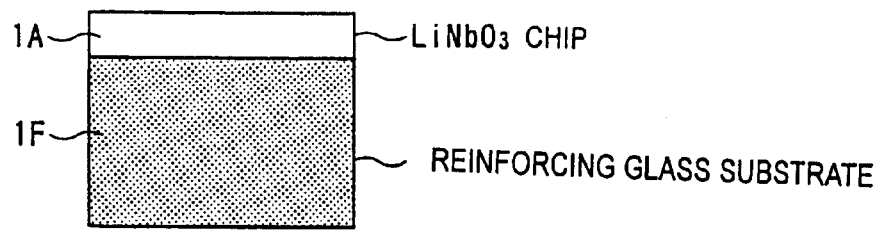
FIGS. 4 and 5 are schematic views showing partial configurations of the optical device according to the different embodiments of the present invention.
Figure 5:
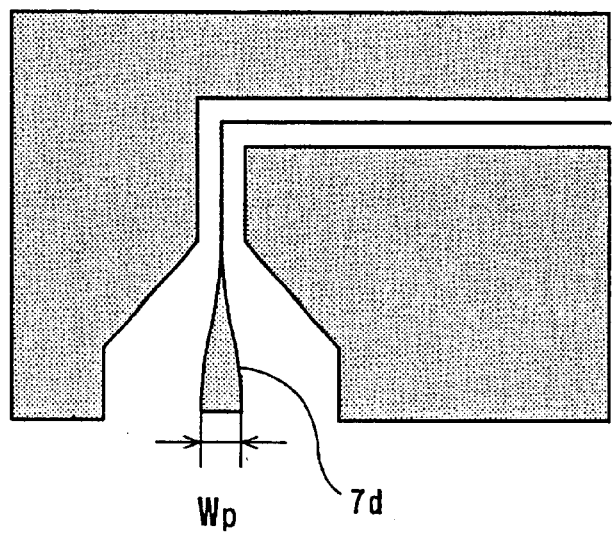

It is to be noted that the optical device 1 according to the first embodiment can be configured as shown in FIG. 4 by adhering, upon mounting, a glass substrate 1F having a greater thickness than that of the substrate 1A to one face of the substrate 1A, that is, a face other than the face on which the electrodes are formed. The glass substrate 1F is superior in physical strength than the substrate 1A and has a characteristic of a lower dielectric constant than that of $LiNbO_3$ of which the substrate 1A is made. The adhesion of the glass substrate 1F to the substrate 1A is effective in maintaining the characteristic as an optical modulator and reinforcing the physical strength of a device.

In other words, the chip thickness of the optical device can be reduced by adhering the glass substrate 1F upon mounting to reinforce the strength. Where the chip thickness of the optical device 1 is reduced, ripples also when a transmission data signal of a frequency of approximately 40 GHz (gigahertz) or more is modulated can be reduced.

Figure 6:
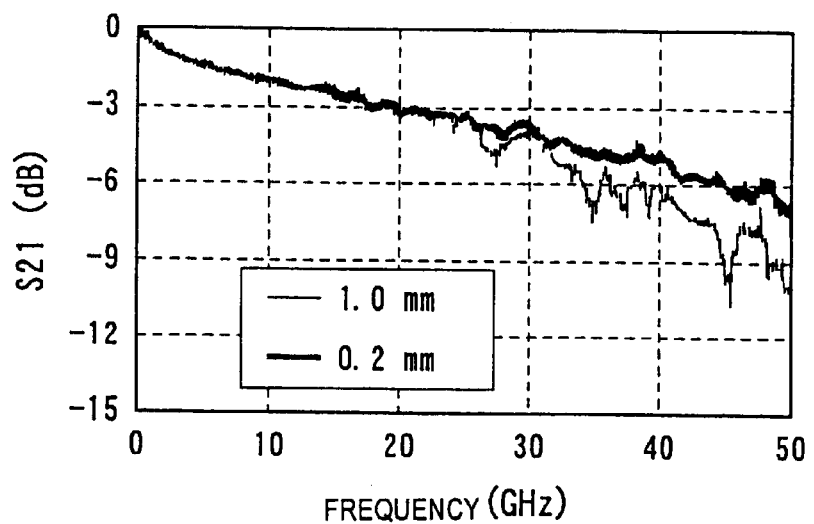
FIGS. 6 and 7 are diagrams illustrating operation and effects of the optical modulators as optical devices according to the different embodiments of the present invention.

More particularly, FIG. 6 illustrates an S21 characteristic where the chip thickness of the optical device 1 described above is 0.2 m and 1.0 mm. As seen from FIG. 6, ripples of the S21 characteristic can be reduced by reducing the chip thickness. In other words, ripples upon modulation of a data signal having a frequency of approximately 40 GHz or more are reduced and the physical strength upon mounting is assured by reducing the chip thickness and adhering the glass substrate 1F to the substrate 1A.

The optical modulators 11-1 and 12-2 which compose the optical device 1 described above are common in that they have substantially similar waveguide structures and electrode structures to each other, but are different from each other in that different signals from each other are obtained as a result of modulation by them and different signals are applied to their electrodes.

In particular, as hereinafter described, the optical modulator 11-1 modulates light from the light source not shown into an optical RZ clock of, for example, approximately 40 GHz with a clock signal of 20 Gb/s (20 gigabits per second) applied to the first electrode 7A-1 thereof. Meanwhile, the optical device 12-2 modulates the optical RZ clock from the optical device 11-1 into an optical RZ data signal of, for example, 40 Gb/s with an NRZ data signal of 40 Gb/s applied to the second electrode 7B-2 thereof.

Accordingly, the optical device 1 functions as an optical modulator of the clock modulation type having a function of modulating light from the light source into an optical RZ clock and then superposing and modulating the optical RZ clock signal on and with an optical RZ data signal by the modulation actions of the two optical modulators 11-1 and 11-2 integrated as a unitary member therein.

Figure 1:
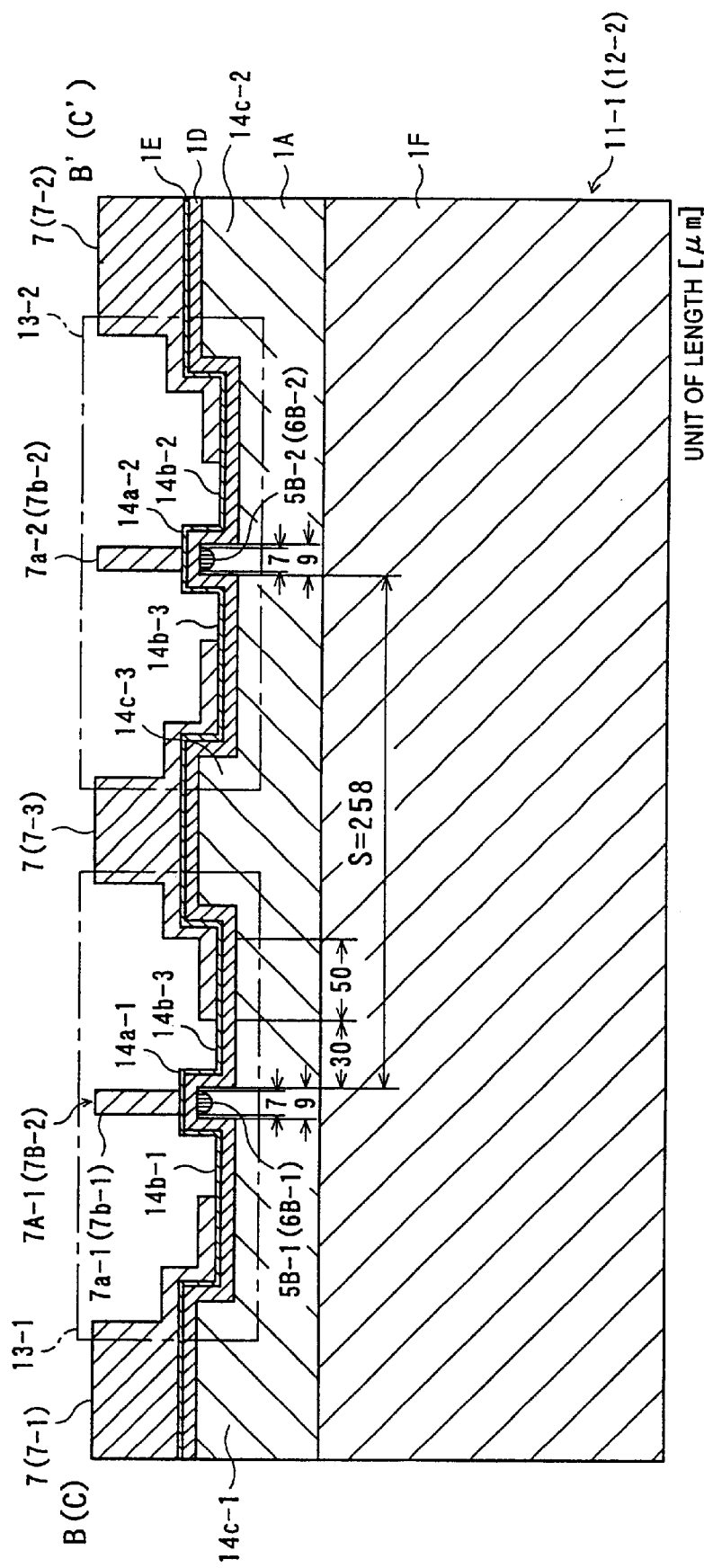

It is to be noted that the optical modulator 11-1 taken along line B–B' in FIG. 3 and the optical modulator 12-2 along line C–C' have the same structure as shown in FIGS. 1 and 2. Both of the optical modulators 11-1 and 11-2 have a structure indicated by reference numeral 7 in FIG. 1 which is a characteristic element of the invention of the present application. Here, a general structure of the optical device 1 is described first, and then the characteristic element of the present invention is described thereafter.

Referring to FIG. 1, the optical device 1 shown includes a substrate 1A made of lithium niobate (LiNbO$_3$) and cut in the Z-axis direction of the crystal orientation (Z-axis cut), a first optical waveguide 5 and a first electrode 7A-1 which are formed on the substrate 1A and form an optical modulator 11-1, and a second optical waveguide 6 and a second electrode 7B-1 which are formed on the substrate 1A and form another optical modulator 12-2. The two optical modulators 11-1 and 12-2 are integrally formed as a unitary member in one chip to achieve miniaturization of the optical modulators.

The first optical waveguide 5 and the second optical waveguide 6 are formed as a unitary member by thermal diffusion of titanium (Ti) or the like so that the second optical waveguide 6 maybe joined by a cascade connection or series connection to the first optical waveguide 5. Consequently, light from the light source is inputted from the input end of the optical device 1 and propagates along the first optical waveguide 5 and the second optical waveguide 6.

The first optical waveguide 5 includes a Y branching waveguide (first Y branching waveguide) 5A and a straight arm waveguide (first arm waveguide) 5B-1 and another straight arm waveguide (second arm waveguide) 5B-2 on the light incoming side, and a Y branching waveguide (second Y branching waveguide) 5C on the light outgoing side. Similarly, the second optical waveguide 6 includes a Y branching waveguide (first Y branching waveguide) 6A and a straight arm waveguide (first arm waveguide) 6B-1 and another straight arm waveguide (second arm waveguide) 6B-2 on the light incoming side, and a Y branching waveguide (second Y branching waveguide) 6C on the light outgoing side.

The first electrode 7A-1 is formed as a partial electrode layer on the substrate 1A to control light which propagates in the first optical waveguide 5, and the second electrode 7B-2 is formed as a partial electrode layer on the substrate 1A to control light which propagates in the second optical waveguide 6.

The first electrode 7A-1 includes a dual electrode having two signal electrodes 7a-1 and 7a-2, and a grounding electrode 7. Also the second electrode 7B-1 includes a dual electrode having two signal electrodes 7b-1 and 7b-2 and the grounding electrode 7.

The signal electrodes 7a-1 and 7a-2 of the first electrode 7A-1 are formed so as to establish electric connection between two connector contacts at an edge portion on one side of the substrate 1A in its widthwise direction. The signal electrode 7a-1 is formed such that part thereof extends along and above the portion at which the straight arm waveguide 5B-1 of the first optical waveguide 5 is formed, and the signal electrode 7a-2 is formed such that part thereof extends along and above the portion at which the other straight arm waveguide 5B-2 of the first optical waveguide 5 is formed.

Also the signal electrodes 7b-1 and 7b-2 of the second electrode 7B-2 are formed so as to establish electric connection between two connector contacts at an edge portion on one side of the substrate 1A in its widthwise direction. The signal electrode 7b-1 is formed such that part thereof extends along and above the portion at which the straight arm waveguide 6B-1 of the second optical waveguide 6 is formed, and the signal electrode 7b-2 is formed such that part thereof extends along and above the portion at which the other straight arm waveguide 6B-2 of the second optical waveguide 6 is formed.

The grounding electrode 7 having such a characteristic structure of the present invention as hereinafter described is formed as a common grounding electrode for the first electrode 7A-1 and the second electrode 7B-2 such that it is positioned on the opposite sides of the signal electrodes 7a-1, 7a-2 and 7b-1, 7b-2 and bias electrodes 7C-1, 7C-2, 7D-1 and 7D-2, which are hereinafter described, in a spaced relationship by a predetermined distance to form a coplanar line on the substrate 1A.

The bias electrodes 7C-1 and 7C-2 shown in FIG. 3 correspond to the other electrodes with respect to the first electrode 7A-1 and serve as a dual bias electrode connected to a DC power supply 7F to supply a bias voltage to the first optical waveguide 5 to supplementarily provide an application voltage for clock modulation. The bias electrode 7C-1 is formed such that it extends along and above a branch portion of the Y branching waveguide 5C on the straight arm waveguide 5B-1 side, and the bias electrode 7C-2 is formed such that it extends along and above a branch portion of the Y branching waveguide 5C on the straight arm waveguide 5B-2 side.

The bias electrodes 7D-1 and 7D-2 correspond to the other electrodes with respect to the second electrode 7B-2 and serve as a dual bias electrode connected to a DC power supply 7E to supply a bias voltage to the second optical waveguide 6 to supplementarily provide an application voltage for NRZ optical modulation. The bias electrode 7D-1 is formed such that it extends along and above a branch portion of the Y branching waveguide 6C on the straight arm waveguide 6B-1 side, and the bias electrode 7D-2 is formed such that it extends along and above a branch portion of the Y branching waveguide 6C on the straight arm waveguide 6B-2 side.

It is to be noted that, in the optical device 1 according to the first embodiment, also when the modulation characteristic is varied by a temperature variation or the like, the modulation efficiency can be kept optimally by the bias voltages from the bias electrodes 7C-1, 7C-2, 7D-1 and 7D-2 described above.

A connection pad 7d for connection of an external apparatus is formed as a connector contact for an electric wiring line at an end portion of each of the signal electrodes 7a-1, 7a-2, 7b-1 and 7b-2 and the bias electrodes 7C-1, 7C-2, 7D-1 and 7D-2 such that it has a pad width Wp greater than any other electrode line portion.

Figure 7:
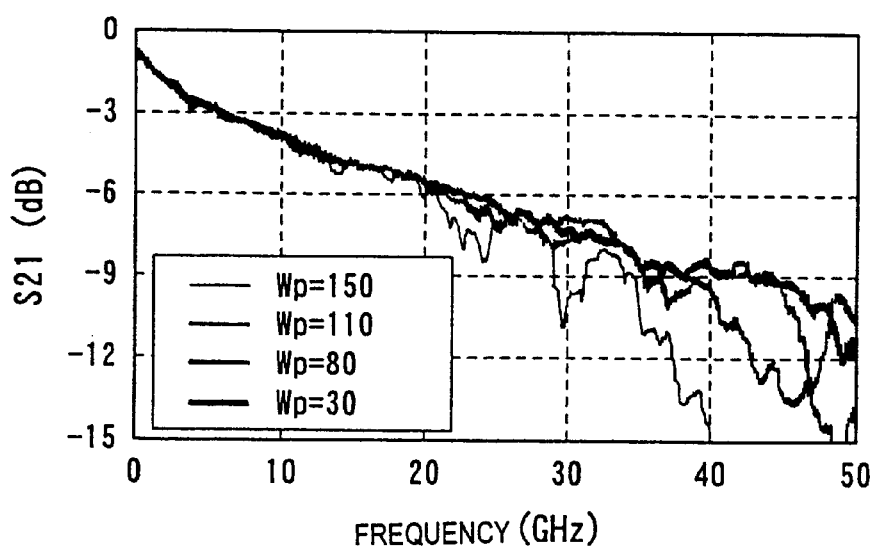

More particularly, FIG. 7 illustrates the S21 characteristic where the width of the connection pad 7d described above has several values between 30 to 170 microns ($\mu$m). From FIG. 7, it can be seen that, where a signal having a frequency of approximately 40 GHz or more is applied to the first electrode 7A-1, the second electrode 7B-2 and so forth described hereinabove, the width Wp of the connection pad 7d should be set to 80 microns to the utmost or less, preferably to 70 microns or less in order to sufficiently remove ripples.

Figure 8:
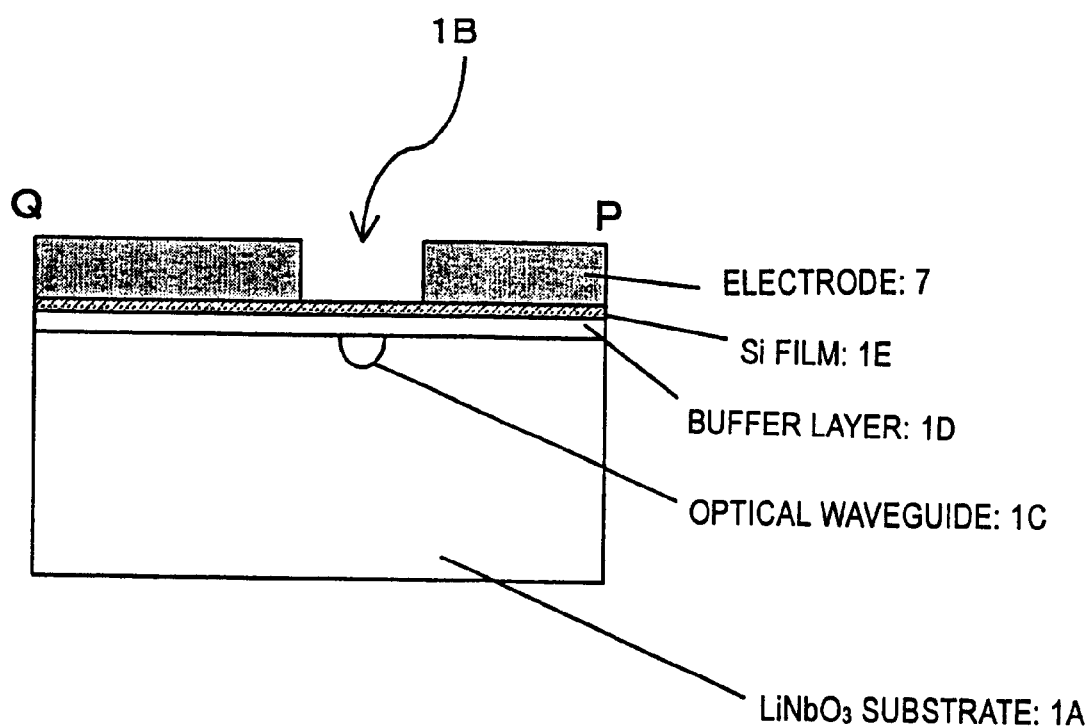
FIG. 8 is a partial cross sectional view showing a recessed portion of the optical device according to the first embodiment.

FIG. 8 is a P–Q sectional view of the optical device 1 of the clock modulation type shown in FIG. 1. Referring to FIG. 8, a grounding electrode non-formation region 1B serving as light loss reduction means for reducing the loss of light which propagates in a waveguide 1C at a connection portion between the first optical waveguide 5 and the second optical waveguide 6 described hereinabove is formed, and no grounding electrode is formed in the region 1B. Consequently, the possible loss of light which propagates in the waveguide 1C where an electrode is otherwise present in the region 1B can be reduced.

As shown in FIG. 8, a buffer layer 1D and a silicon (Si) film 1E each having a thickness smaller than the thickness of the layer of the substrate 1A are stacked between the layer of the first and second electrodes 7A and 7B and the bias electrodes 7C-1, 7C-2, 7D-1 and 7D-2 and the layer of the substrate 1A described hereinabove. The buffer layer 1D is provided to suppress the absorption loss of light which propagates in the optical waveguides while the silicon layer 1E is provided to uniformize electric charge in the substrate 1A.

More particularly, the buffer layer 1D is formed between the substrate 1A and the first and second electrodes 7A-1 and 7B-2 such that it extends over the entire area of the substrate 1A (and traces the profiles of a first groove 14b-1, a second groove 14b-2 and a third groove 14b-3). However, the thickness of portions of the buffer layer 1D which are present in the grooves 14b-1 to 14b-3 may be set greater than the thickness of a portion of the buffer layer 1D which is present in any other portion.

Figure 12A:
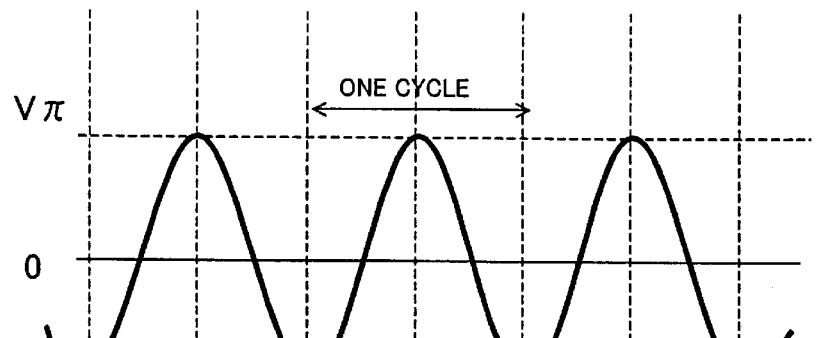
Figure 12B:
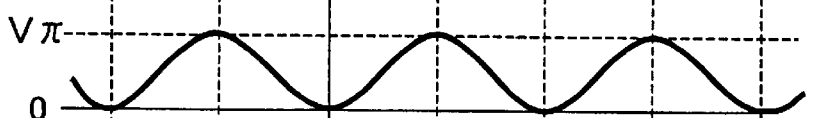

Referring back to FIG. 3, a clock generation drive section 8A generates such a sine wave signal of a frequency of, for example, 20 GHz as seen in FIG. 12(b). The sine wave signal of 20 GHz generated is applied through a connection pad 7d to the signal electrode 7a-1 of the dual electrode.

A phase delaying section 9A delays a clock signal from the clock generation drive section 8A by a time ($\tau$) corresponding to a predetermined phase (180 degrees) and converts the voltage of the clock signal. The clock signal (refer to FIG. 12(c)) of 20 GHz from the phase delaying section 9A is applied through a connection pad 7d to the other signal electrode 7a-2 of the dual electrode.

Figure 9:
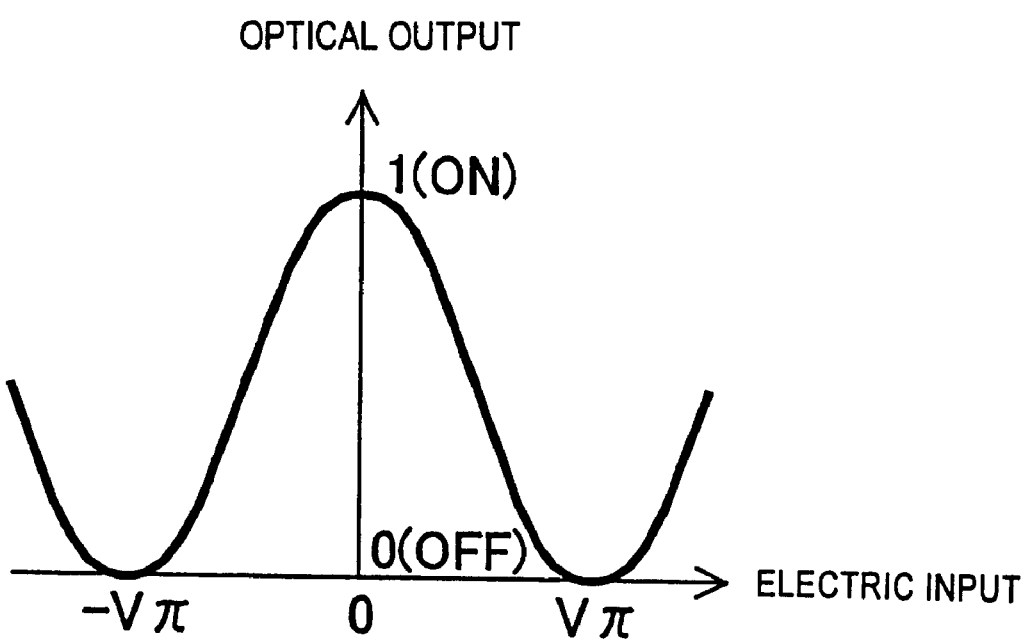
FIGS. 9 to 12(f) are diagrams illustrating optical modulation operation by the optical modulator as the optical device according to the first embodiment.

Light which propagates in a waveguide in the first embodiment exhibits a variation of the light level thereof in the form of a cosine wave as seen in FIG. 9 in accordance with a voltage value applied through an electrode due to an electro-optical effect. In particular, when the voltage value to be applied to the electrode is set to "V$\pi$" or "–V$\pi$" as seen from FIG. 9, the lowest level "0" is obtained.

In other words, if the amplitude value of the clock signal is adjusted so that the optical output level may have a maximum value when the difference value between the potential of the signal electrode 7a-1 and the potential of the signal electrode 7a-2 given by a sine wave of 20 GHz produced by the clock production drive section 8A described hereinabove (refer to the value of a potential difference waveform 8A' of FIG. 10) has a maximum value and a minimum value but the optical output level may have a minimum value when the potential difference value has a middle value, then the optical output level can be varied for two cycles by a variation of the clock signal for one cycle.

It is to be noted that, if the amplitude and the phase of the clock signal of 20 GHz to be applied to the signal electrodes 7a-1 and 7a-2 are adjusted and a bias voltage is applied to the bias electrodes 7C-1 and 7C-2, then the voltage value described above can be adjusted to such a voltage value that corresponds to the potential difference waveform 8A' described above.

Consequently, the optical device 11-1 composed of the first optical waveguide 5 and the first electrode 7A-1 modulates light from the light source so that an optical clock signal of 40 GHz is propagated on the output side (refer to reference character 5C' of FIG. 1) of the Y branching waveguide 5C.

Figure 12C:
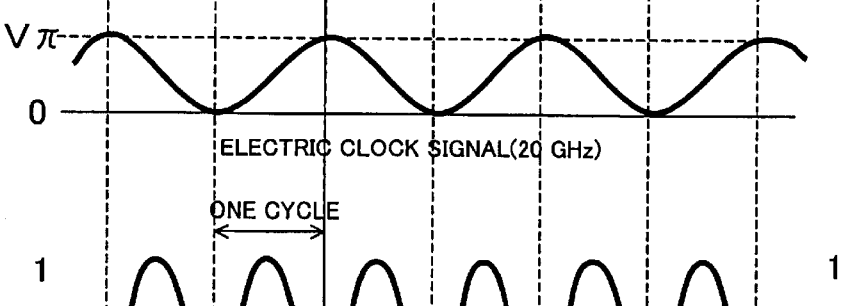
Figure 12D:
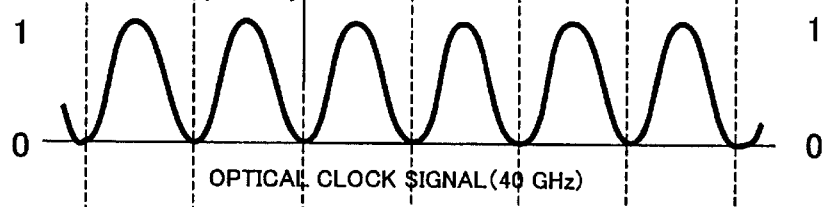
Figure 12E:
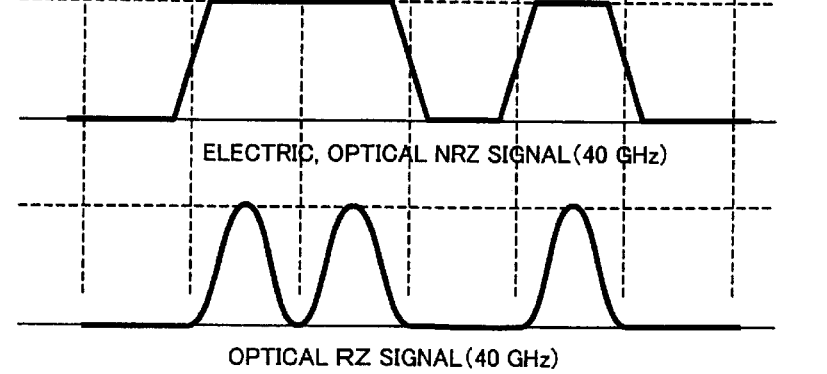

In other words, if the voltages to be applied to the straight arm waveguides 5B-1 and 5B-2 are adjusted with the bias voltages applied from the bias electrodes 7C-1 and 7C-2 while the potential difference of a sine wave of 20 GHz of FIG. 12(a) is provided between the signal electrodes 7a-1 and 7a-2 using such clock signals of 20 GHz produced by the clock generation drive section 8A and the phase delaying section 9A as shown in FIGS. 12(b) and 12(c), then such an optical clock signal of 40 GHz as shown in FIG. 12(d) modulated from the light from the light source, that is, an optical signal modulated into an RZ data signal of 40 Gb/s having a data string of "1", "1", "1", . . . .

Accordingly, the clock generation drive section 8A and the phase delaying section 9A described above function as an optical clock generator which is connected to the first electrode 7A-1 and generate an optical RZ signal when a clock signal is applied to the first electrode 7A-1.

Further, the clock generation drive section 8A and the phase delaying section 9A described above produce, when a clock signal of a frequency (20 GHz) equal to one half the transmission rate (40 Gb/s) per unit time of output light of the optical device 1 is applied to the first electrode 7A-1, an optical RZ signal of a rate equal to the transmission rate per unit time of the output light of the optical device 1 of the clock modulation type.

In other words, light which propagates in the straight arm waveguides 5B-1 and 5B-2 of the first optical waveguide 5 is acted upon by an electro-optical effect of an electric signal applied to the first electrode 7A-1 so that an optical RZ clock of 40 GHz can be produced on the output side (refer to reference character 5C' of FIG. 1) of the Y branching waveguide 5C.

A pair of NRZ data signal generators 10-1 and 10-2 are connected to the signal electrodes 7b-1 and 7b-2 of the second electrode 7B-2 and supply NRZ data signals of the bit rate corresponding to the optical clock.

The NRZ data signal generators 10-1 and 10-2 generate the same NRZ data signals having phases displaced by 180 degrees from each other. The NRZ data signal voltage from the NRZ data signal generator 10-1 is applied to the signal electrode 7b-1, and the NRZ data signal voltage from the NRZ data signal generator 10-2 is applied to the signal electrode 7b-2.

It is to be noted that, in FIG. 3, the NRZ data signal generators 10-1 and 10-2 are shown such that they generate data signals of 40 Gb/s. Accordingly, the NRZ data signal generators 10-1 and 10-2 supply, for example, such an electric NRZ signal as illustrated in FIG. 12 (e) (data of 40 Gb/s indicative of "0", "1", "1", "0", "1", "0") to the signal electrodes 7b-1 and 7b-2 of the second electrode 7B-2.

Figure 12F:
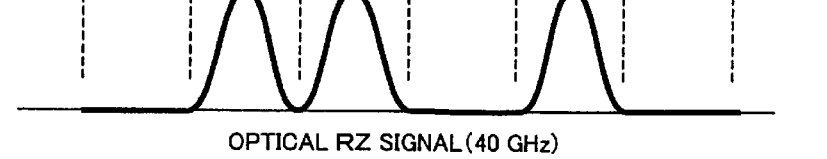

In particular, the second Mach-Zehnder modulator 12-2 composed of the second optical waveguide 6 and the second electrode 7B-2 can modulate an optical clock signal (40 GHz optical CLK) 15 of 40 GHz from the first optical waveguide 5 with an NRZ data signal (40 Gb/s NRZ-data) 16 of 40 Gb/s at a timing synchronized with the optical clock signal so that it can output such an optical RZ data signal of 40 Gb/s as shown in FIG. 12(f).

More particularly, light which propagates in the straight arm waveguides 6B-1 and 6B-2 of the second optical waveguide 6 is acted upon by an electro-optical effect of an electric signal applied to the second electrode 7B-2 so that an optical RZ data signal of 40 Gb/s is outputted on the output side (refer to reference character 6C' of FIG. 1) of the Y branching waveguide 6C.

It is to be noted that, similarly to bias voltages from the bias electrodes 7C-1 and 7C-2 described hereinabove, the bias voltages applied from the bias electrodes 7D-1 and 7D-2 supplementarily adjust the voltage value for optical modulation to be applied to the second electrode 7B-2 so as to allow optimum optical modulation.

FIG. 1 is a schematic view generally showing a cross section of the optical modulator 11-1 taken along line B–B' and a cross section of the optical modulator 12-2 taken along line C–C' of FIG. 3. In the following, description is given particularly of the cross section of the optical modulator 11-1 taken along line B–B'.

As described hereinabove, the glass substrate 1F having a thickness greater than that of the substrate 1A is adhered to the face of the substrate 1A opposite to the face on which the electrodes 7A-1 and 7B-2 are formed.

The substrate 1A has formed on the electrode formation face thereof a first ridge 14a-1, a second ridge 14a-2, first to third groove 14b-1 to 14b-3, and first to third banks 14c-1 to 14c-2.

The first and second ridges 14a-1 and 14a-2 extend in parallel to each other, and the straight arm waveguide 5B-1 which forms the first optical waveguide 5 is included in the first ridge 14a-1 while the straight arm waveguide 5B-2 is included in the second ridge 14a-2. The first signal electrode 7a-1 is formed at the top of the first ridge 14a-1 while the second signal electrode 7a-2 is formed at the top of the second ridge 14a-2.

In other words, the first optical waveguide 5 is formed on the substrate 1A such that it is first branched at the first Y branching waveguide 5A into the straight arm waveguide 5B-1 as a first waveguide included in the first ridge 14a-1 and the straight arm waveguide 5B-2 as a second arm waveguide included in the second ridge 14a-2 and then loins together at the second Y branching waveguide 5C. It is to be noted that the straight arm waveguides 5B-1 and 5B-2 can be formed with the width of 7 µm as seen in FIG. 1.

The first and second grooves 14b-1 and 14b-2 are positioned on the opposite outer sides of the first and second ridges 14a-1 and 14a-2, respectively, and the third groove 14b-3 is positioned between the first and second ridges 14a-1 and 14a-2.

The first and second banks 14c-1 and 14c-2 are positioned on the opposite outer sides of the first and second grooves 14b-1 and 14b-2, respectively, and the third bank 14c-3 divides the third groove 14b-3 intermediately between the first and second ridges 14a-1 and 14a-2 in the third groove 14b-3.

The grounding electrode 7 described hereinabove extends to the first groove 14b-1 adjacent to the first bank 14c-1, the second groove 14b-2 adjacent to the second bank 14c-2, and the third groove 14b-3 adjacent to the opposite sides of the third bank 14c-3. While, in FIG. 1, the grooves 14b-1 to 14b-3 are formed such that they have a width of 80 µm hereinafter described, since the grounding electrode 7 extends in this manner, the width of a portion of each of the grooves 14b-1 to 14b-3 in which the grounding electrode 7 is not formed is 30 µm.

In particular, the portion of the grounding electrode 7 (refer to reference numeral 7-1 in parenthesis in FIG. 1) formed on the first bank 14c-1 extends stepwise up to the first groove 14b-1; the portion of the grounding electrode 7 (refer to reference character 7-2 in parenthesis in FIG. 1) formed on the second bank 14c-2 extends to the second groove 14b-2; and the portion of the grounding electrode 7 (refer to reference character 7-3 in parenthesis in FIG. 1) formed on the third 14c-3 extends to the third groove 14b-3.

Since the grounding electrode 7 is formed such that it extends to the grooves 14b-1 to 14b-3 as described above, the intensity of the electric field applied to each of the straight arm waveguides 5B-1 and 5B-2 by electric signals applied to the signal electrodes 7a-1 and 7a-2 can be increased. Consequently, even if the voltage signals (drive voltage or Vπ) to be applied to the signal electrodes 7a-1 and 7a-2 are lowered, an electric field intensity necessary for optical modulation can be obtained.

In other words, since the value of Vπ indicated in FIG. 9 can be lowered while maintaining the optical modulation performance by means of the grounding electrode 7 formed to extend in such a manner as described above, the amplitude values (amplitude values Vπ of the waveforms in FIGS. 12(b) and 12c)) of the voltages to be applied to the signal electrodes 7a-1 and 7a-2 can be reduced.

It is to be noted that the extending structure of the grounding electrode 7 described above can reduce the drive voltage while maintaining the modulation performance at least if the grounding electrode 7 has the extending structure for those portions of the signal electrodes 7a-1 and 7a-2 which extend above and along the straight arm waveguides 5B-1 and 5B-2.

Portions of the cross section taken along line B–B' of the sectional view of FIG. 1 which are denoted by reference characters 13-1 and 13-2 in particular have a cross sectional structure such as that shown in FIG. 2. It is to be noted that naturally the portions of the cross section taken along line C–C' in FIG. 1 have a similar cross sectional configuration to that of FIG. 2.

Here, the ridges 14*a*-1 and 14*a*-2 are formed with a height Gh such that they extend in parallel to the straight arm waveguides 5B-1 and 5B-2 including the portions at which the straight arm waveguides 5B-1 and 5B-2 on which the signal electrodes 7*a*-1 and 7*a*-2 are placed are formed. The first to third grooves 14*b*-1 to 14*b*-3 are formed by partly removing or digging the substrate 1A to the depth Gh by etching.

The first bank 14*c*-1 is formed by digging the first groove 14*b*-1 with the depth Gh and the width Gw on the outer side of the first groove 14*b*-1, i.e., on the outer side in the widthwise direction of the substrate 1A; the second bank 14*c*-2 is formed by digging the second groove 14*b*-2 in a similar shape to that of the first groove 14*b*-1 on the outer side of the second groove 14*b*-2, i.e., on the outer side in the widthwise direction of the substrate 1A; and the third bank 14*c*-3 is formed by digging the third groove 14*b*-3 at the two locations in a similar condition to that of the first and second grooves 14*b*-1 and 14*b*-2.

In other words, the ridges 14*a*-1 and 14*a*-2 and the banks 14*c*-1 to 14*c*-3 are formed by digging the grooves 14*b*-1 to 14*b*-3 described above with the same depth Gh. It is to be noted that the top face levels of the ridges 14*a*-1 and 14*a*-2 and the top face levels of the banks 14*c*-1 and 14*c*-2 are set substantially level with each other.

While the signal electrode 7*a*-1 is formed on the ridge 14*a*-1 and the signal electrode 7*a*-2 is formed on the ridge 14*a*-2, the contact width We of the signal electrodes 7*a*-1 and 7*a*-2 with the ridges 14*a*-1 and 14*a*-2 is smaller than the width Rw of the ridges 14*a*-1 and 14*a*-2.

Further, while the signal electrodes 7*a*-1 and 7*a*-2 have a three-layer structure including a base portion 71 of a height $h_1$, an intermediate portion 72 of another height $h_2$, and a top portion 73 of a further height $h_3$, also the grounding electrode 7 may be configured in a similar manner. Further, the signal electrodes 7*a*-1 and 7*a*-2 are formed such that the width W of the top faces thereof is greater than the contact width We with the ridges 14*a*-1 and 14*a*-2.

Further, the extending portions of the grounding electrode 7 to the first to third grooves 14*b*-1 to 14*b*-3 can be formed such that they extend along the shapes of the grooves 14*b*-1 to 14*b*-3 with a substantially uniform thickness.

It is to be noted that, by forming the optical modulator while adjusting the extending length S2 of the grounding electrode 7 and the length Se of the electrode non-formation region between the signal electrodes 7*a*-1 and 7*a*-2 and the grounding electrode 7 in FIG. 2, the parameters for evaluation of characteristics of an optical modulator, that is, velocity match between an optical signal in the optical waveguide and an electric signal in the electrode, impedance matching, a drive voltage and so forth, can be adjusted readily and optimally.

It is to be noted that, in FIGS. 1 and 2, Gh=6, Gw=80, We=5, Rw=9, h=32, $h_1$=4, $h_2$=16, $h_3$=12, S=258, Se=31, $S_2$=50, and W=10 to 25, and the thickness $d_1$ of the buffer layer 1D is 0.6 and the thickness $d_2$ of the silicon film 1E is 0.05 (all in the unit of $\mu$m).

When light from the light source not shown is introduced into the optical device 1 of the first embodiment having the configuration described above, while the light propagates in the first optical waveguide 5, it is converted into an optical RZ signal (optical clock) of 40 GHz with a sine wave of 20 GHz by the first electrode 7A-1 to which an RZ signal of a frequency of 20 GHz generated by the clock generation drive section 8A is applied.

Further, while the optical RZ signal propagates in the second optical waveguide 6, NRZ signals of 40 Gb/s generated by the NRZ data signal generators 10-1 and 10-2 are applied to signal electrodes 7*b*-1 and 7*b*-2 to modulate the optical clock into an optical RZ data signal of 40 Gb/s.

The optical RZ data signal obtained by the modulation by the optical device 1 is transmitted to the reception side through an optical fiber not shown.

Since the grounding electrode 7 described above extends to the first groove 14*b*-1 adjacent to the first bank 14*c*-1, the second groove 14*b*-2 adjacent to the second bank 14*c*-2, and the third groove 14*b*-3 adjacent to the opposite sides of the third bank 14*c*-3, the amplitude values of the voltages (amplitude values V $\pi$ of the waveforms shown in FIGS. 12(*b*) and 12(*c*)) to be applied to the signal electrodes 7*a*-1 and 7*a*-2 are lowered while maintaining a favorable optical modulation performance.

Further, the two sets of signal electrodes 7*a*-1, 7*a*-2 and 7*b*-1, 7*b*-2 described above are formed as dual electrodes. Where they are formed as such dual electrodes, the drive voltage as a voltage value to be applied to each electrode can be lowered when compared with an alternative case wherein each signal electrode is formed as a single electrode.

Furthermore, since the cutaway portion (optical loss reduction means) 1B serving as a region in which no grounding electrode layer is formed is provided at the portion of the waveguide 1C extending from the first optical waveguide 5 to the second optical waveguide 6, light to the electrode is not absorbed because of absence of an electrode, and consequently, the loss of light to propagate can be reduced.

In this manner, with the optical device 1 according to the first embodiment of the present invention, since the grounding electrode 7 of the optical modulators 11-1 and 11-2 extends to the first groove 14*b*-1 adjacent to the first bank 14*c*-1, the second groove 14*b*-2 adjacent to the second bank 14*c*-2, and the third groove 14*b*-3 adjacent to the opposite sides of the third bank 14*c*-3, the amplitude values of the voltages (drive voltages) to be applied to the signal electrodes 7*a*-1 and 7*a*-2 can be lowered while maintaining a favorable optical modulation performance. Consequently, the transmission quality can be improved, power can be saved, and the performance of the optical modulator can be improved.

Further, since the substrate 1A is Z-axis cut, the optical device 1 is advantageous also in that four of the performance evaluation parameters upon configuration of a high speed optical modulator, that is, the drive voltage, the velocity match between the optical signal and the electric signal, the attenuation constant of the electric signal, and the characteristic impedance (50 $\Omega$) can be matched readily.

Furthermore, since the optical device 1 includes the buffer layer 1D, it is advantageous in that the absorption loss of light propagating in the optical waveguides 5 and 6 can be suppressed, which contributes to improvement in transmission quality.

Further, since the width of the connection pad 7*d* provided at each of the ends of the signal electrodes 7*a*-1, 7*a*-2, 7*b*-1 and 7*b*-2 and the bias electrodes 7C-1, 7C-2, 7D-1 and 7D-2 is set to 70 microns or less, ripples can be removed sufficiently, which can contribute to improvement in transmission quality.

Further, in the optical device 1 of the first embodiment, since the first Mach-Zehnder optical modulator 11-1 and the second Mach-Zehnder optical modulator 12-2 are integrated as a unitary member on the substrate 1A and the clock generator 8A and the NRZ data signal generators 10-1 and 10-2 are provided, two modulators including a modulator which uses an NRZ electric signal for coding and another modulator which converts an NRZ electric signal into an RZ signal are formed as an integrated circuit in one chip. Consequently, the optical device 1 is advantageous, in addition to such advantages as described above, in that reduction in space and reduction of the cost for the apparatus configuration can be anticipated.

Furthermore, since the cutaway portion 1B serving as optical loss reduction means in which no grounding electrode layer is formed is provided at the portion of the waveguide 1C extending from the first optical waveguide 5 to the second optical waveguide 6, the optical device 1 is advantageous further in that the loss of light to propagate can be further reduced.

It is to be noted that, while, in the first embodiment described above, the grounding electrode 7 of both of the two optical modulators 11-1 and 12-2 which have dual electrodes have the characteristic structure of the present invention, according to the present invention, the optical device may be configured otherwise such that the grounding electrode 7 of only one of the two optical modulators 11-1 and 12-2 has the characteristic structure of the present invention.

b1. Second Embodiment

Figure 13:
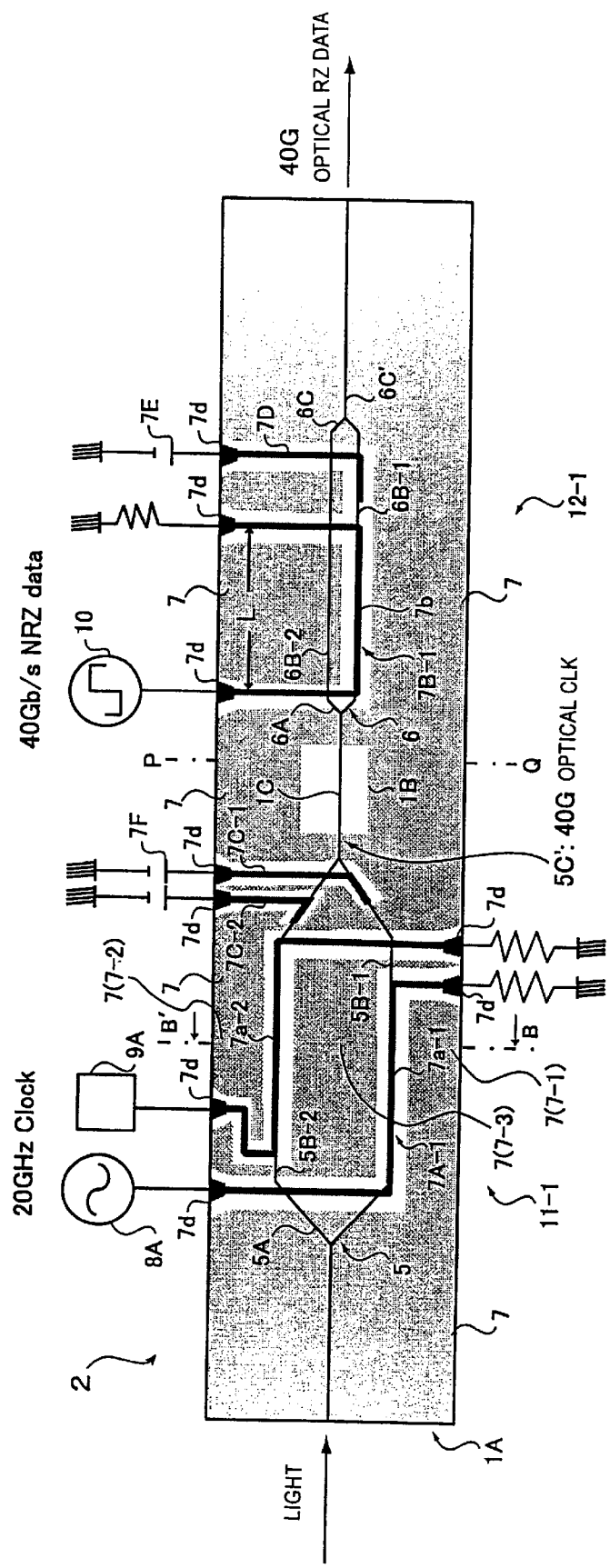
FIG. 13 is a schematic view showing an optical device according to a second embodiment of the present invention.

FIG. 13 is a schematic view showing an optical modulator according to a second embodiment of the present invention. Referring to FIG. 13, the optical device 2 shown is common to the optical device 1 of the first embodiment described hereinabove in that it includes two different Mach-Zehnder optical modulators integrated as a unitary member on a Z-axis cut substrate 1A made of lithium niobate ($LiNbO_3$), but is different in configuration to the second Mach-Zehnder optical modulator 12-1.

It is to be noted that, in FIG. 13, like reference characters to those in FIGS. 1 to 3 denote like elements. Particularly, the first Mach-Zehnder optical modulator 11-1 is configured similarly to that in the first embodiment described hereinabove.

In particular, the optical modulator 11-1 which composes the optical modulator 2 according to the second embodiment has, in common with the first embodiment described hereinabove, as a cross section thereof taken along line B–B', such a cross sectional structure as shown in FIGS. 1 and 2. Further, the optical modulator 11-1 includes a grounding electrode 7 having the characteristic structure of the present invention, and ridges 14a-1 and 14a-2, grooves 14b-1 to 14b-3 and banks 14c-1 to 14c-3 similar to those in the first embodiment.

Meanwhile, the optical modulator 12-1 includes a second electrode 7B-1 and a bias electrode 7D which are different from those of the modulator 12-2 in the first embodiment. However, the optical modulator 12-1 is similar in terms of the substrate 1A and the second waveguide 6.

It is to be noted that, similarly to the first embodiment described hereinabove, portions of the optical waveguides 5 and 6 which are covered with the grounding electrode 7 are also indicated by solid lines in FIG. 13.

The second electrode 7B-1 is formed on the substrate 1 for controlling light which propagates in the second optical waveguide 6, and includes a single signal electrode 7b and the grounding electrode 7.

The signal electrode 7b of the second electrode 7B-1 is formed so as to establish an electric connection between two connector contacts at edge portions on one side of the substrate 1A in its widthwise direction. The signal electrode 7b is formed further such that part thereof extends along and above the portion at which the straight arm waveguide 6B-1 of the second optical waveguide 6 is formed.

An NRZ data signal generator 10 is connected to the signal electrode 7b of the second electrode 7B-1 and supplies an NRZ data signal of a bit rate corresponding to the optical clock to the second electrode 7B-1.

It is shown in FIG. 13 that the NRZ data signal generator 10 generates a data signal of 40 Gb/s.

When light from the light source not shown is introduced into the optical device 2 of the second embodiment of the present invention having the configuration described above, while the incoming light propagates in the first optical waveguide 5, it is converted into an optical RZ signal (optical clock) of 40 GHz with a sine wave of 20 GHz by the first electrode 7A-1 to which an RZ signal of a frequency of 20 GHz generated by the clock generation drive section 8A is applied.

Further, while the optical RZ signal propagates in the second optical waveguide 6, an NRZ signal of 40 Gb/s generated by the NRZ data signal generator 10 is applied to the signal electrode 7b to modulate the optical clock into an optical RZ data signal of 40 Gb/s.

The optical RZ data signal obtained by the modulation by the optical device 1 of the clock modulation type is transmitted to the reception side through an optical fiber not shown.

Since the grounding electrode 7 formed for the optical modulator 11 described above extends to the first groove 14b-1 adjacent to the first bank 14c-1, the second groove 14b-2 adjacent to the second bank 14c-2, and the third groove 14b-3 adjacent to the opposite sides of the third bank 14c-3 as shown in FIGS. 1 and 2, the amplitude values of the voltages (amplitude values V π of the waveforms shown in FIGS. 12(b) and 12(c)) to be applied to the signal electrodes 7a-1 and 7a-2 are lowered while maintaining a favorable optical modulation performance.

Further, the signal electrodes 7a-1 and 7a-2 described above are formed as a dual electrode. Where they are formed as such a dual electrode, the drive voltage as a voltage value to be applied to each electrode can be lowered when compared with an alternative case wherein each signal electrode is formed as a single electrode.

Furthermore, since the region 1B in which no grounding electrode layer is formed is provided at the portion of the waveguide 1C extending from the first optical waveguide 5 to the second optical waveguide 6, light is not absorbed by the electrode because of absence of an electrode, and consequently, the loss of light to propagate can be reduced.

In this manner, with the optical device 2 according to the second embodiment of the present invention, since the grounding electrode 7 of the optical modulator 11-1 extends to the first groove 14b-1 adjacent to the first bank 14c-1, the second groove 14b-2 adjacent to the second bank 14c-2, and the third groove 14b-3 adjacent to the opposite sides of the third bank 14c-3, the amplitude values of the voltages (drive voltages) to be applied to the signal electrodes 7a-1 and 7a-2 can be lowered while maintaining a favorable optical modulation performance. Therefore, the optical modulator 2 is advantageous in that the transmission quality can be improved, power can be saved, and the performance of the optical modulator can be improved.

Further, since the optical device 2 includes the buffer layer 1D, it is advantageous in that the absorption loss of light propagating in the optical waveguides 5 and 6 can be suppressed, which contributes to improvement in transmission quality.

Furthermore, since the substrate 1A is Z-axis cut, the optical device 1 is advantageous also in that four of the performance evaluation parameters upon configuration of a high speed optical modulator, that is, the drive voltage, the velocity match between the optical signal and the electric signal, the attenuation constant of the electric signal, and the characteristic impedance (normally 50 Ω), can be matched readily.

Further, in the optical device 2 of the second embodiment, since the first Mach-Zehnder optical modulator 11-1 and the second Mach-Zehnder optical modulator 12-2 are integrated as a unitary member on the substrate 1A and the clock generator 8A and the NRZ data signal generator 10 are provided, two modulators including a modulator which uses an NRZ electric signal for coding and another modulator which converts an NRZ electric signal into an RZ signal are formed as an integrated circuit in one chip. Consequently, the optical device 2 is advantageous, in addition to such advantages as described above, in that reduction in space and reduction of the cost for the apparatus configuration can be anticipated.

b2. Modification to the Second Embodiment

In the second embodiment described above, the clock generation drive section 8A uses a sine wave signal of 20 GHz (a frequency equal to ½ that of an optical RZ signal to be obtained finally) to produce an optical clock signal of 40 GHz from light which propagates in the first optical waveguide 5.

Figure 14:
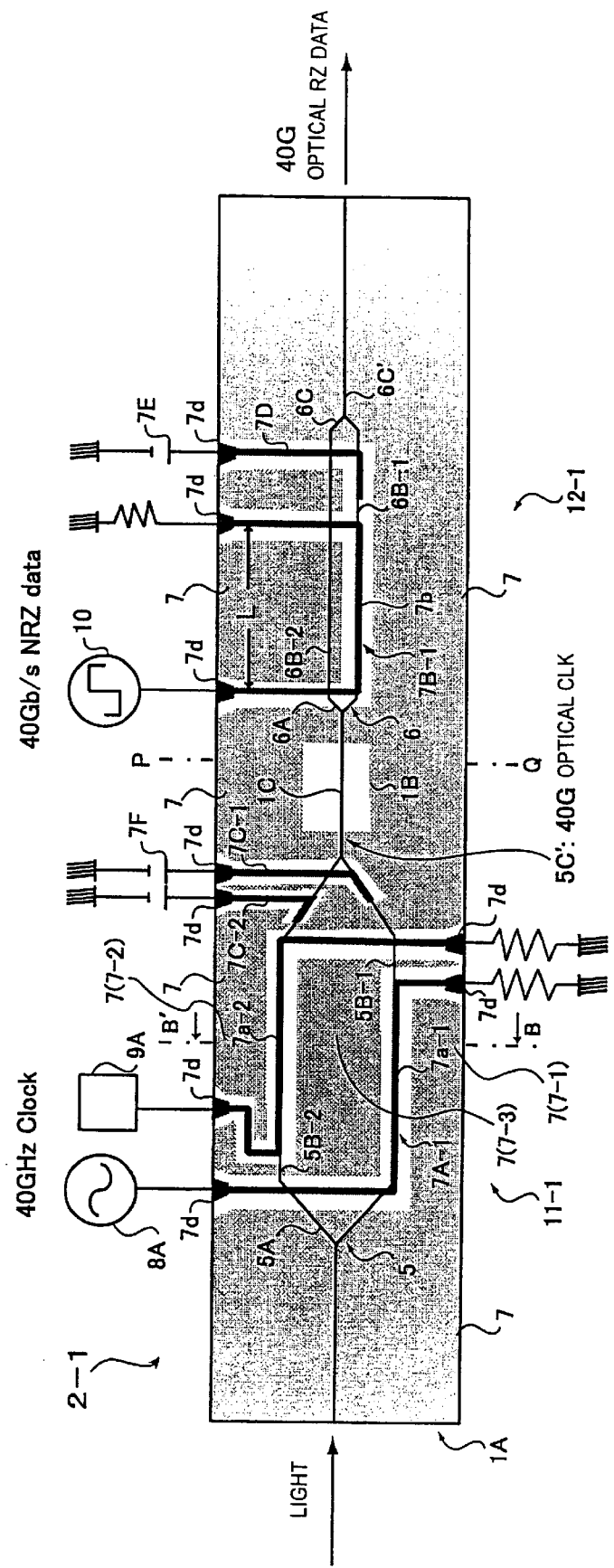
FIG. 14 is a schematic view showing an optical device according to a modification of the second embodiment of the present invention.

In contrast, a modification to the second embodiment includes, like an optical modulator 2-1 shown in FIG. 14, a clock generation drive section 8B to produce a sine wave of 40 GHz corresponding to the data signal rate to be obtained finally in place of the clock generation drive section 8A which generates a sine wave of 20 GHz. The optical clock signal produced is modulated into an optical RZ data signal of 40 Gb/s by a second Mach-Zehnder optical modulator 12-1 in the next stage and is outputted as the optical RZ data signal.

In other words, the clock generation drive section 8B and the phase delaying section 9B described above produce, when a sine wave signal voltage of a frequency (40 GHz) corresponding to the transmission rate (40 Gb/s) per unit time of output light of the optical device 2-1 of the phase modulation type is applied to the first electrode 7A-1, an RZ signal of a transmission rate (40 Gb/s) equal to the transmission rate (40 Gb/s) per unit time of the output light of the optical device 2-1 of the clock modulation type.

It is to be noted that, in FIG. 14, like reference characters to those in FIG. 13 denote like elements. Accordingly, also the optical modulator 11-1 which composes the optical modulator 2-1 shown in FIG. 14 has a structure of such a cross section taken along line B–B' as shown in FIGS. 1 and 2 and includes a grounding electrode 7 having the characteristic structure of the present invention.

Further, similarly as in the second embodiment described hereinabove, also portions of the optical waveguides 5 and 6 which are covered with the grounding electrode 7 are indicated by solid lines in FIG. 14.

The phase delaying section 9B delays a clock signal of 40 GHz from the clock generation drive section 8B by a time corresponding to a predetermined phase (180 degrees). Accordingly, the clock signal voltage from the phase delaying section 9B described above is applied to the signal electrode 7a-1 while the clock signal voltage whose phase and voltage have been controlled by the phase delaying section 9B is applied to the signal electrode 7a-2.

Figure 10:
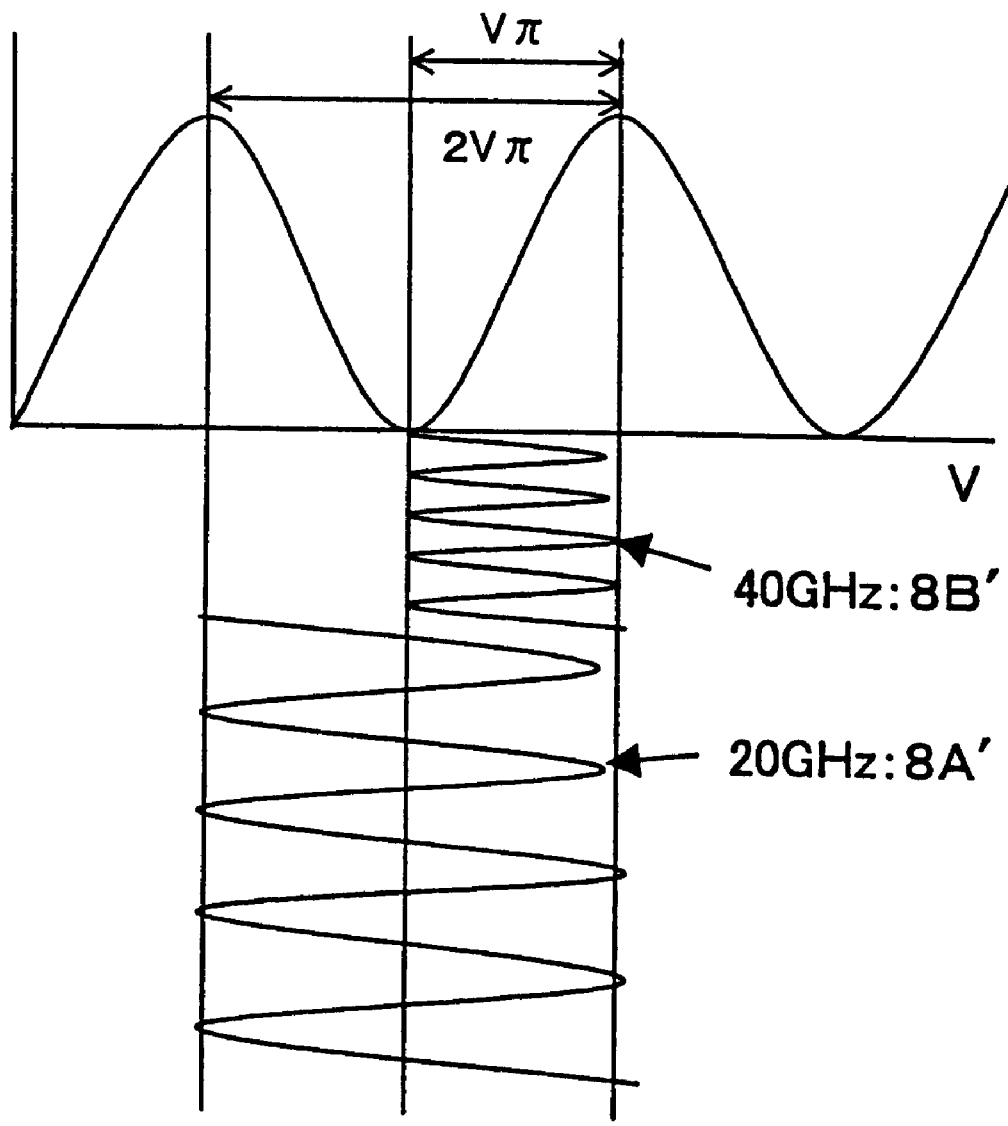
Figure 11:
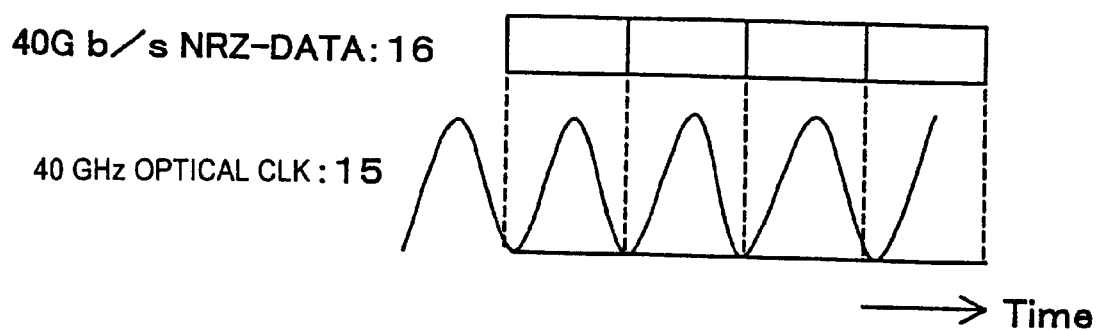

The amplitude value of the clock signal produced by the clock generation drive section 8B is adjusted such that the optical output level may be "1" when the clock signal has a phase with which the potential difference between the signal electrode 7a-1 and the signal electrode 7a-2 is maximum as seen from the value of the potential difference waveform 8B' shown in FIG. 10 but the optical output level may be "0" when the clock signal has another phase with which the value of the potential difference is minimum, and the optical output level can be varied by an amount corresponding to one cycle by a variation of the sine wave from the clock generation drive section 8B.

Figure 15:
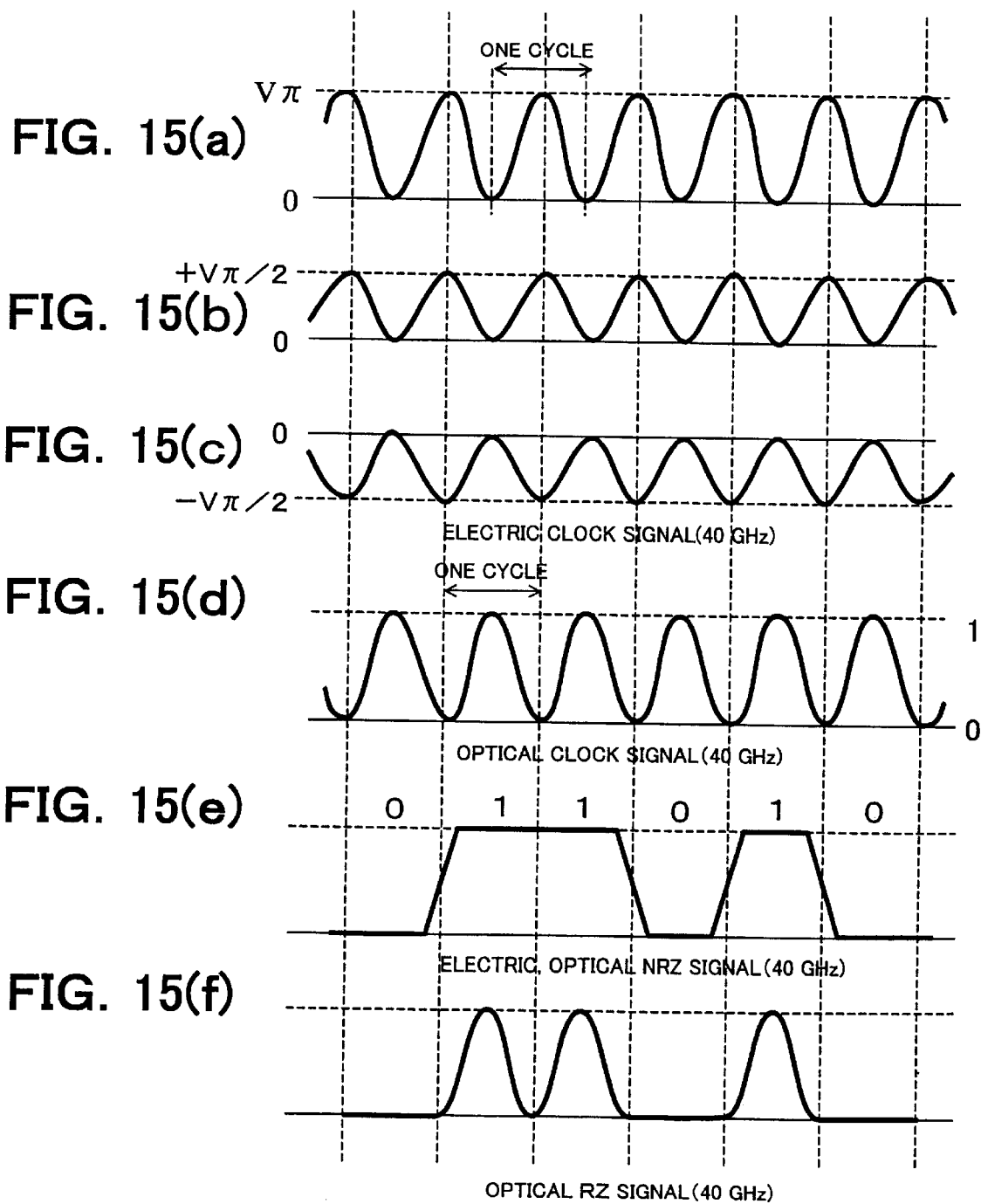
FIGS. 15(a) to 15(f) are diagrams illustrating optical modulation operation by an optical modulator of the clock modulation type according to the modification of the third embodiment of the present invention.

In other words, if the potential difference of a sine wave of 40 GHz of FIG. 15(*a*) is provided between the signal electrodes 7a-1 and 7a-2 using such electric clock signals of 40 GHz produced by the clock generation drive section 8B and the phase delaying section 9B as shown in FIGS. 15(*b*) and 15(*c*), then the light from the light source is modulated into such an optical clock signal (data signal of 40 Gb/s having a data string of "1", "1", "1", . . . ) of 40 GHz as shown in FIG. 15(*d*) and propagating to the second optical waveguide 6 in the next stage.

Further, similarly as in the case of the modulator 2 shown in FIG. 13, an optical clock signal which propagates in the second optical waveguide 6 is modulated by the signal electrode 7d to which an electric NRZ data signal (voltage signal, refer to FIG. 15(*e*)) from the NRZ data signal generator 10 is applied, and is outputted as an optical RZ data signal illustrated in FIG. 15(*f*).

Accordingly, the clock generation drive section 8B and the phase delaying section 9B described above function as an optical clock generator which is connected to the first electrode 7A-1 and produces an optical RZ signal when a clock signal is applied to the first electrode 7A-1.

It is to be noted that the potential difference of a sine wave with which the optical output level can be variably controlled between a minimum value and a maximum value is Vπ as seen from FIG. 10.

Accordingly, with the optical modulator 2-1 according to the modification to the second embodiment of the present invention, since the grounding electrode 7 of the optical modulator 11-1 extends to the first groove 14b-1 adjacent to the first bank 14c-1, the second groove 14b-2 adjacent to the second bank 14c-2, and the third groove 14b-3 adjacent to the opposite sides of the third bank 14c-3, similar advantages to those of the second embodiment described hereinabove can be achieved.

It is to be noted that, while the single clock generation drive section 8A or 8B is used as a sine wave supply source for the two signal electrodes 7a-1 and 7a-2 which compose the first electrode 7A-1 and a clock signal of an adjusted voltage of the opposite phase is produced by the phase delay section 9A or 9B as in the case of the optical modulator 2 or 2-1 described hereinabove with reference to FIG. 13 or 14, production of clock signals is not limited to this. For example, two clock generation drive sections may be used to produce clock signals of opposite phases to each other.

c. Third Embodiment

Figure 16:
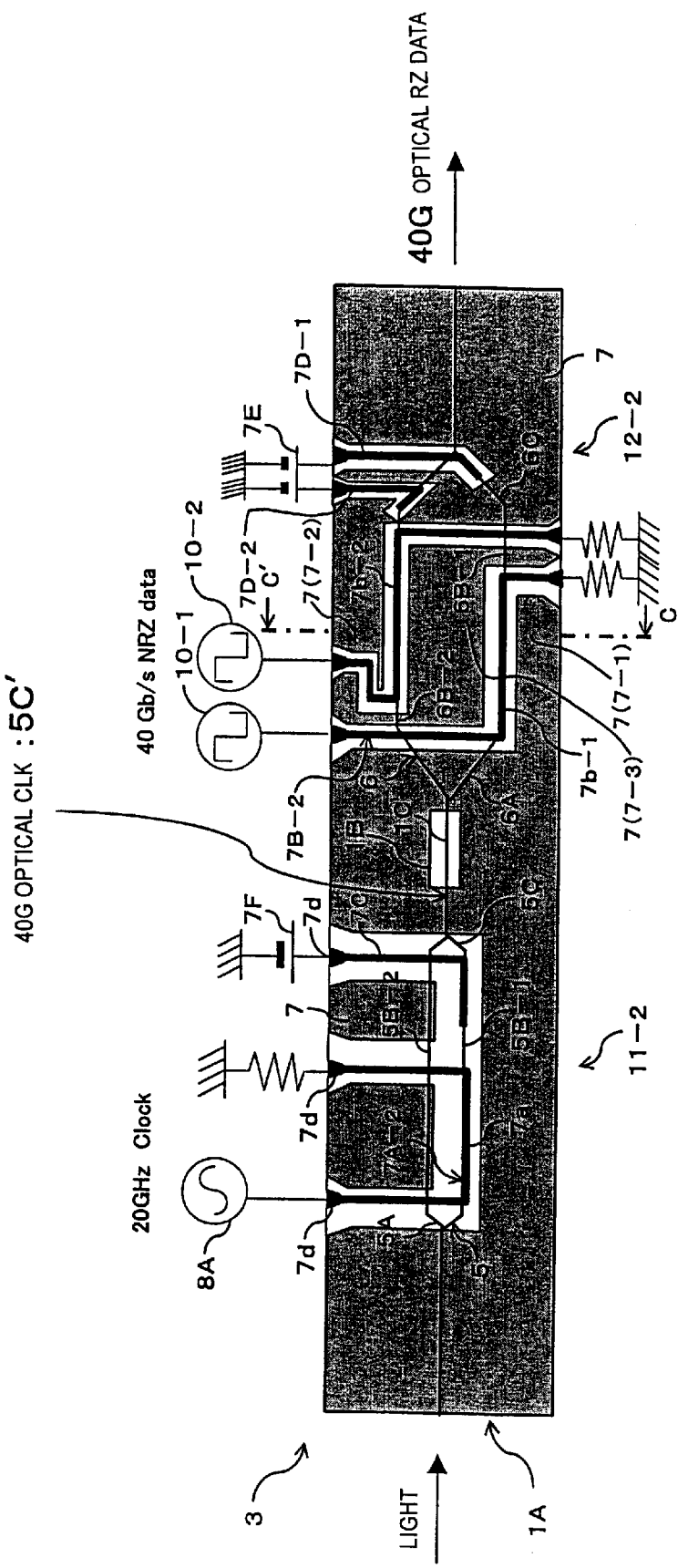
FIG. 16 is a schematic view showing an optical device according to a third embodiment of the present invention.

FIG. 16 is a schematic view showing an optical modulator according to a third embodiment of the present invention. Referring to FIG. 16, the optical device 3 shown is common to the optical device 1 of the first embodiment described hereinabove in that it includes two different Mach-Zehnder optical modulators 11-2 and 12-2 integrated as a unitary member on a Z-axis cut substrate 1A made of lithium niobate (LiNbO$_3$), but is different in configuration of the optical modulator 11-2 in the preceding stage.

It is to be noted that, in FIG. 16, like reference characters to those in FIGS. 1 to 3 denote like elements. Particularly, the optical modulator 12-2 is configured similarly to that in the first embodiment described hereinabove.

In particular, the optical modulator 12-2 which composes the optical modulator 3 according to the third embodiment has, similarly as in the first embodiment described hereinabove, as a cross section thereof taken along line B–B', such a cross sectional structure as shown in FIGS. 1 and 2. Further, the optical modulator 12-2 includes a grounding electrode 7 having the characteristic structure of the present invention, and ridges 14a-1 and 14a-2, grooves 14b-1 to 14b-3 and banks 14c-1 to 14c-3 similar to those in the first embodiment.

Meanwhile, the optical modulator 11-2 includes a first electrode 7A-2 and a bias electrode 7C which are different from those of the optical modulator 11-1 in the first embodiment. However, the optical modulator 11-2 is similar in terms of the substrate 1A and the first waveguide 5.

It is to be noted that, similarly to the first and second embodiments described hereinabove, also portions of the optical waveguides 5 and 6 which are covered with the grounding electrode 7 are indicated by solid lines in FIG. 16.

The first electrode 7A-2 is formed on the substrate 1 for controlling light which propagates in the first optical waveguide 6, and includes a single signal electrode 7a and the grounding electrode 7.

The signal electrode 7a of the second electrode 7A-2 is formed so as to establish an electric connection between two connector contacts at edge portions on one side of the substrate 1A in its widthwise direction. The signal electrode 7a is formed further such that part thereof extends along and above the portion at which the straight arm waveguide 5B-1 of the first optical waveguide 5 is formed. Consequently, the signal electrode 1 can modulate light propagating in the first optical waveguide 5 into an optical clock by single driving with the clock signal (voltage signal) inputted thereto from the clock generation drive section 8A.

Further, the bias electrode 7C applies a dc voltage from the dc power supply 7F as a single electrode to the first optical waveguide 5 to supplementarily apply an applied voltage for clock modulation and is formed such that it extends above and along the straight arm waveguide 5B-1. It is to be noted that also the bias electrode 7C described above includes a connection pad 7d similarly to the bias electrodes 7D-1 and 7D-2 of the second Mach-Zehnder optical modulator 12-2.

When light from the light source not shown is introduced into the optical device 3 of the third embodiment of the present invention having the configuration described above, while the incoming light propagates in the first optical waveguide 5, it is converted into an optical RZ signal (optical clock) of 40 GHz with a sine wave of 20 GHz by the first electrode 7A-2 to which an RZ signal of a frequency of 20 GHz generated by the clock generation drive section 8A is applied.

Further, while the optical RZ signal propagates in the second optical waveguide 6, an NRZ signal (voltage signal) of 40 Gb/s generated by the NRZ data signal generator 10 is applied to the signal electrode 7b to modulate the optical clock into an optical RZ data signal of 40 Gb/s. The optical RZ data signal obtained by the modulation by the optical modulator 3 is transmitted to the reception side through an optical fiber not shown.

Since the grounding electrode 7 formed for the optical modulator 12-2 described above extends to the first groove 14b-1 adjacent to the first bank 14c-1, the second groove 14b-2 adjacent to the second bank 14c-2, and the third groove 14b-3 adjacent to the opposite sides of the third bank 14c-3 as shown in FIGS. 1 and 2, the amplitude values of the voltages (amplitude values V π of the waveforms shown in FIGS. 12(b) and 12(c)) to be applied to the signal electrodes 7a-1 and 7a-2 are lowered while maintaining a favorable optical modulation performance.

Further, the signal electrodes 7b-1 and 7b-2 described above are formed as a dual electrode. Where they are formed as such a dual electrode, the drive voltage as a voltage value to be applied to each electrode can be lowered when compared with an alternative case wherein each signal electrode is formed as a single electrode.

Furthermore, since the region 1B in which no grounding electrode layer is formed is provided at the portion of the waveguide 1C extending from the first optical waveguide 5 to the second optical waveguide 6, light is not absorbed by the electrode because of absence of an electrode, and consequently, the loss of light to propagate can be reduced.

In this manner, with the optical device 3 according to the third embodiment of the present invention, since the grounding electrode 7 of the optical modulator 12-2 extends to the first groove 14b-1 adjacent to the first bank 14c-1, the second groove 14b-2 adjacent to the second bank 14c-2, and the third groove 14b-3 adjacent to the opposite sides of the third bank 14c-3, the amplitude values of the voltages (drive voltages) to be applied to the signal electrodes 7a-1 and 7a-2 can be lowered while maintaining a favorable optical modulation performance. Therefore, the optical modulator 3 is advantageous in that the transmission quality can be improved, power can be saved, and the performance of the optical modulator can be improved.

Further, since the optical device 3 includes the buffer layer 1D, it is advantageous in that the absorption loss of light propagating in the optical waveguides 5 and 6 can be suppressed, which contributes to improvement in transmission quality.

Furthermore, since the substrate 1A is Z-axis cut, the optical device 3 is advantageous also in that four of the performance evaluation parameters upon configuration of a high speed optical modulator, that is, the drive voltage, the velocity match between the optical signal and the electric signal, the attenuation constant of the electric signal, and the characteristic impedance (50 Ω), can be matched readily.

Further, in the optical device 3 of the third embodiment, since the Mach-Zehnder first optical modulator 11-2 and the Mach-Zehnder second optical modulator 12-2 are integrated as a unitary member on the substrate 1A and the clock generator 8A and the NRZ data signal generators 10-1 and 10-2 are provided, two modulators including a modulator which uses an NRZ electric signal for coding and another modulator which converts an NRZ electric signal into an RZ signal are formed as an integrated circuit in one chip. Consequently, the optical device 3 is advantageous in that reduction in space can be achieved while the tolerance is improved and reduction of the cost for apparatus configuration can be anticipated.

d. Fourth Embodiment

Figure 17:
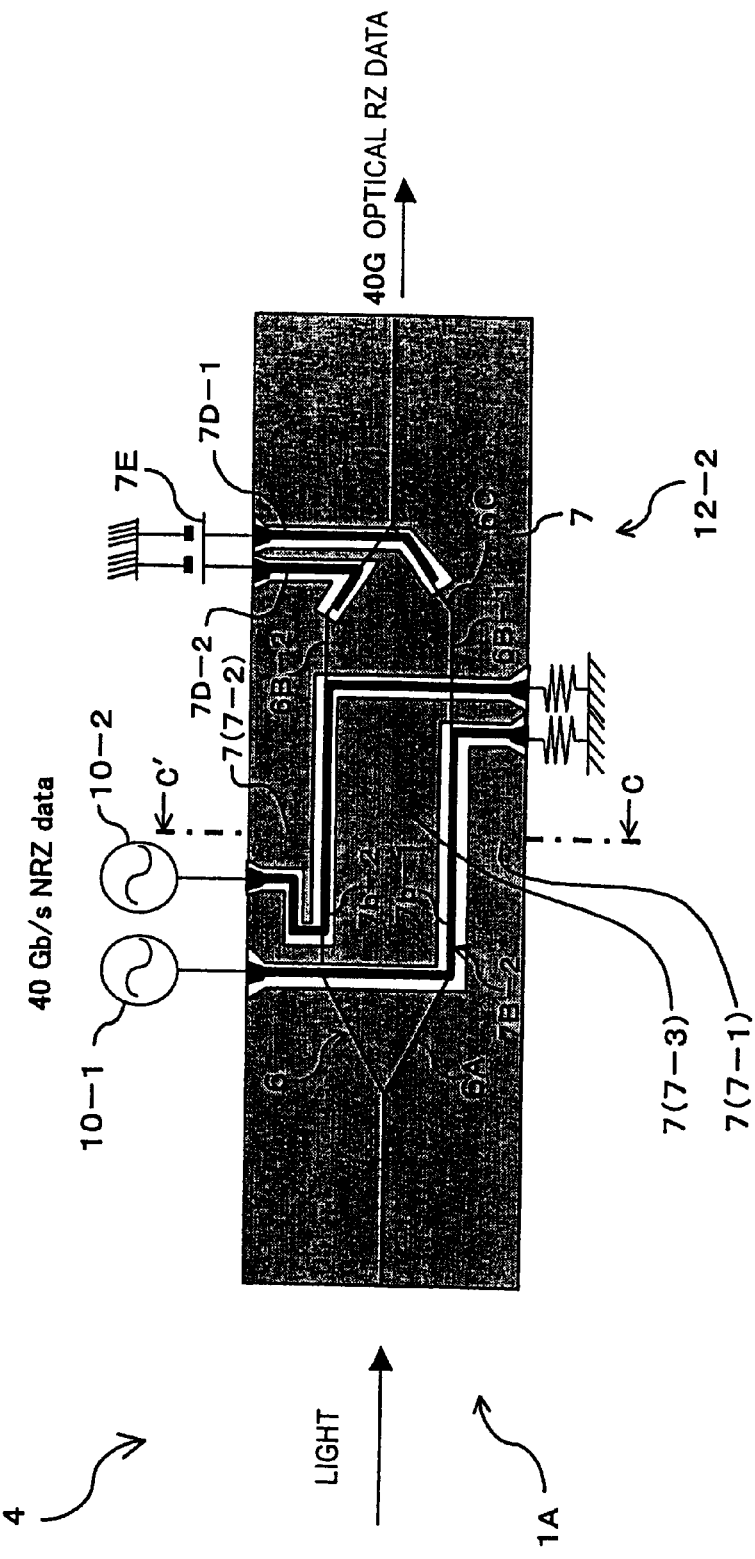
FIG. 17 is a schematic view showing an optical device according to a fourth embodiment of the present invention.

In the first to third embodiments described above, an optical modulator of the clock modulation type to which an optical modulator having a grounding electrode which extends to the grooves, which is the characteristic portion of the present invention, is applied is described in detail. However, according to the present invention, naturally it is possible, for example, as shown in FIG. 17, to form the optical modulator having the grounding electrode 7 as a dual drive optical modulator 4 of a single member having a basically similar configuration to that of the optical modulators 11-1 and 12-2 in the first to third embodiments described above.

Figure 22:
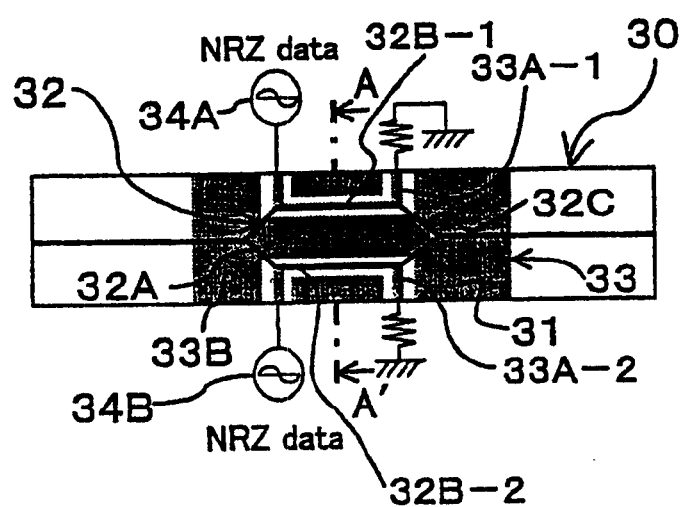
FIG. 22 is a schematic view showing a dual drive optical modulator
Figure 23:
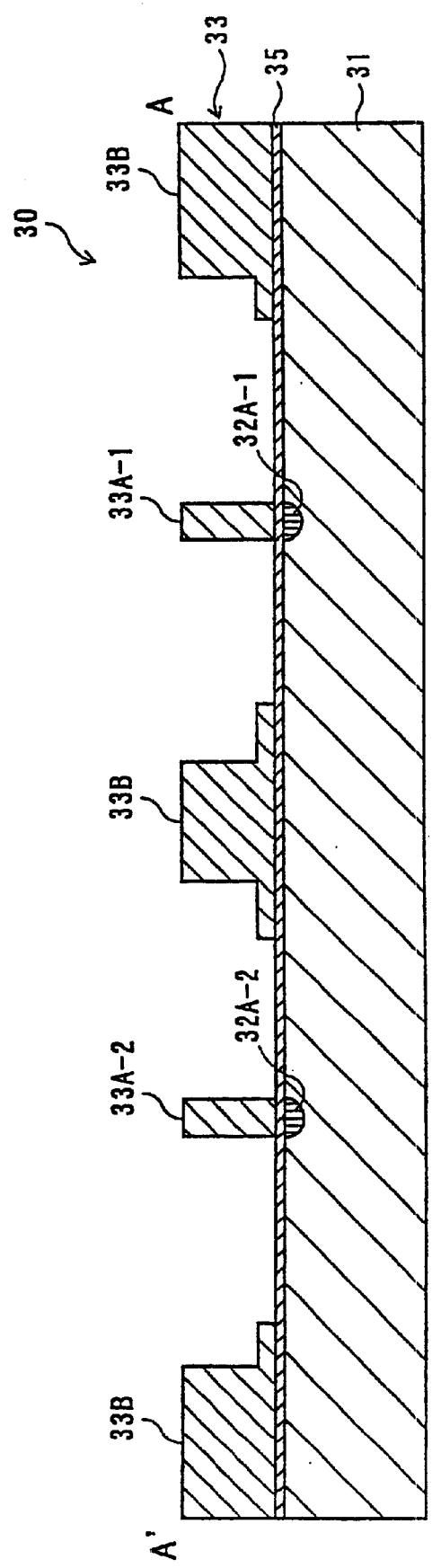
FIG. 23 is a sectional view taken along line A–A' showing a sectional structure of the dual drive optical modulator shown in FIG. 22.

In particular, the optical modulator 4 according to the fourth embodiment can be used as a dual drive modulator which performs NRZ data modulation of light from a light source similarly to the optical modulator 30 described hereinabove with reference to FIG. 22. However, the optical modulator 4 is different from the optical modulator 30 in that it has, as a cross section thereof taken along line C–C', a structure similar to that shown in FIGS. 1 and 2 described hereinabove and includes ridges 14a-1 and 14a-2, grooves 14b-1 to 14b-3 and banks 14c-1 to 14c-3 which are the characteristic elements of the present invention.

It is to be noted that, similarly to the first to third embodiments described hereinabove, also portions of the optical waveguides 5 and 6 which are covered with the grounding electrode 7 are indicated by solid lines in FIG. 17.

Also the optical modulator 4 according to the fourth embodiment has a basically similar configuration in a cross section thereof taken along line C–C' to that shown in FIG. 1 and 2 similarly as in the optical modulators 11-2 and 12-1 in the embodiments described hereinabove. In FIG. 17, like elements are denoted by line reference characters to those of FIGS. 1 to 3.

Accordingly, the optical modulator 4 according to the fourth embodiment includes a substrate 1A having an electro-optical effect, straight arm waveguides 32B-1 and 32B-2 serving as a pair of optical waveguides formed on the surface of the substrate 1A, a plurality of grooves 14b-1 to 14b-3 provided in the proximity of the straight arm waveguides 32B-1 and 32B-2 on the surface of the substrate 1A, and a grounding electrode 7 provided in the grooves 14b-1 to 14b-3.

When light from a light source (not shown) is introduced into the dual drive optical device 4 shown in FIG. 4, while the incoming light propagates in the Mach-Zehnder optical waveguide 6, it is modulated into an optical RZ signal by the signal electrodes 7b-1 and 7b-2 to which voltage signals of NRZ data or the like are applied. The optical RZ signal is outputted from the optical device 4.

Since the grounding electrode 7 formed for the optical modulator 12-2 described above extends to the first groove 14b-1 adjacent to the first bank 14c-1, the second groove 14b-2 adjacent to the second bank 14c-2, and the third groove 14b-3 adjacent to the opposite sides of the third bank 14c-3 as shown in FIGS. 1 and 2, the amplitude values of the voltages (amplitude values V π of the waveforms shown in FIGS. 12(b) and 12c)) to be applied to the signal electrodes 7b-1 and 7b-2 are lowered while maintaining a favorable optical modulation performance.

Further, the signal electrodes 7b-1 and 7b-2 described above are formed as a dual electrode. Where they are formed as such a dual electrode, the drive voltage as a voltage value to be applied to each electrode can be lowered when compared with an alternative case wherein each signal electrode is formed as a single electrode.

In this manner, also with the optical modulator 4 according to the fourth embodiment, since the grounding electrode 7 extends to the first groove 14b-1 adjacent to the first bank 14c-1, the second groove 14b-2 adjacent to the second bank 14c-2, and the third groove 14b-3 adjacent to the opposite sides of the third bank 14c-3 similarly as in the first to third embodiments described hereinabove, the amplitude values of the voltages (drive voltages) to be applied to the signal electrodes 7a-1 and 7a-2 can be lowered while maintaining a favorable optical modulation performance. Therefore, the optical modulator 4 is advantageous in that the transmission quality can be improved, power can be saved, and the performance of the optical modulator can be improved.

Further, since the optical device 3 includes the buffer layer 1D, it is advantageous in that the absorption loss of light propagating in the optical waveguides 5 and 6 can be suppressed, which contributes to improvement in transmission quality.

Furthermore, since the substrate 1A is Z-axis cut, the optical device 3 is advantageous also in that four of the performance evaluation parameters upon configuration of a high speed optical modulator, that is, the drive voltage, the velocity match between the optical signal and the electric signal, the attenuation constant of the electric signal, and the characteristic impedance (50 Ω), can be matched readily.

e1. Fifth Embodiment

Figures 24A, 24B:
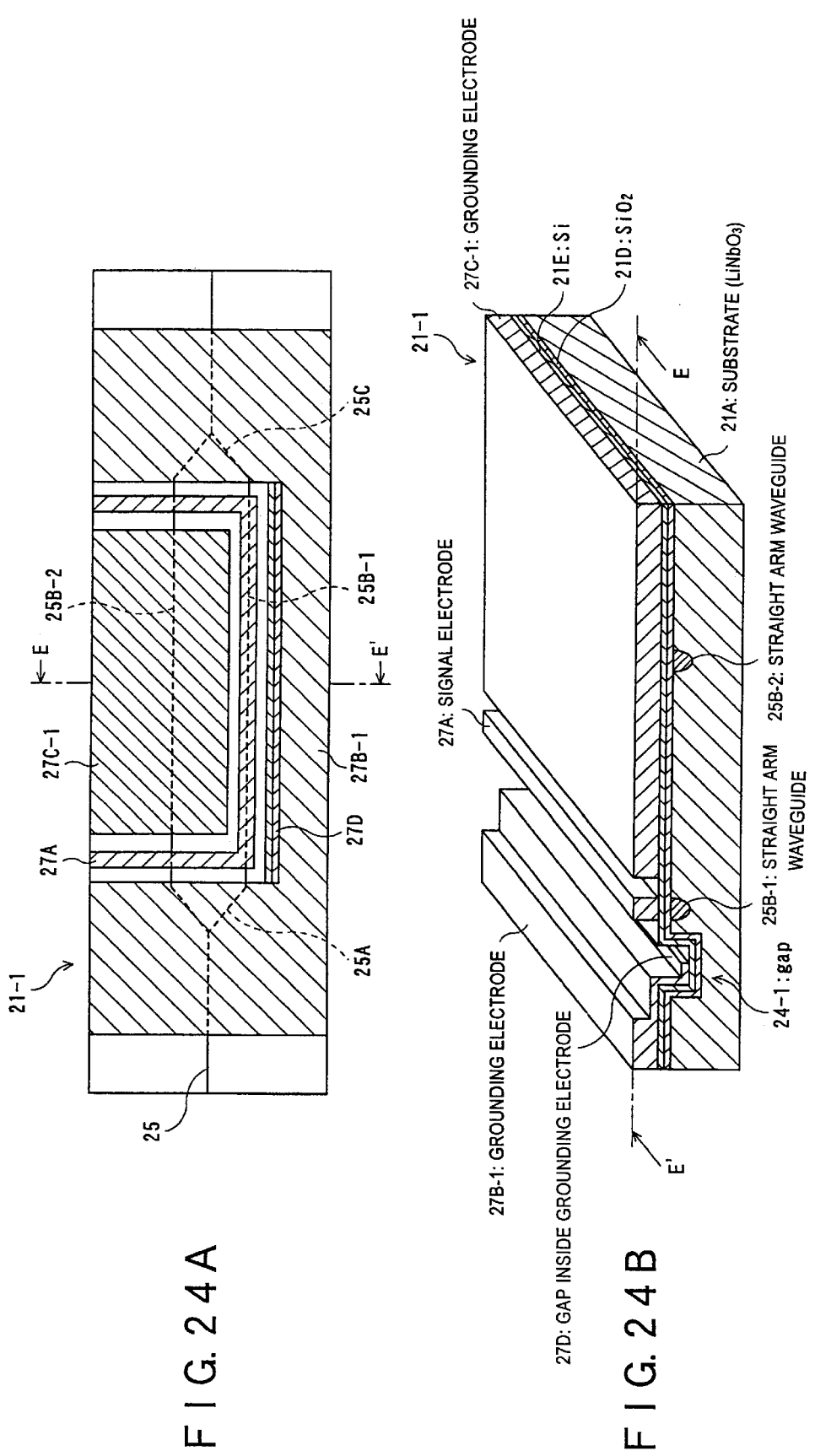
FIG. 24A is a top plan view showing an arrangement configuration of a Mach-Zehnder interferometer as an optical device according to a fifth embodiment of the present invention.
FIG. 24B is a perspective view showing, partly in section, the Mach-Zehnder interferometer shown in FIG. 24A and particularly showing a cross section taken along line E–E' of FIG. 24A.

FIGS. 24A and 24B show a Mach-Zehnder interferometer modulator 21-1 as an optical device according to a fifth embodiment of the present invention. Particularly, FIG. 24A is a top plan view showing an arrangement configuration of the Mach-Zehnder interferometer modulator 21-1, and FIG. 24B is a perspective view showing, partly in section, of the Mach-Zehnder interferometer modulator 21-1 shown in FIG. 24A and particularly showing a cross section taken along line E–E' of FIG. 24A.

The Mach-Zehnder interferometer modulator 21-1 is used, for example, with an optical communication system similarly to the embodiments described hereinabove and includes, as shown in FIGS. 24A and 24B, a substrate 21A, an optical waveguide 25, a groove (gap) 24-1, a signal electrode 27A, and a pair of grounding electrodes 27B-1 and 27C-1.

Referring to FIGS. 24A and 24B, the substrate 21A has an electro-optical effect and may be made of, for example, $LiNbO_3$. The Mach-Zehnder optical waveguide 25 is formed on the surface of the substrate 21A and has a similar configuration to those (refer to reference numerals 5 and 6) of the embodiments described hereinabove. In particular, the optical waveguide 25 includes a pair of Y branching waveguides 25A and 25C and a pair of straight arm waveguides 25B-1 and 25B-2 as seen in FIG. 24A.

The gap 24-1 is provided on the surface of the substrate 21A in the proximity of the straight arm waveguide 25B-1. More particularly, the gap 24-1 is formed to extend along the straight arm waveguide 25B-1 on the outer side of the optical waveguide 25 of the Mach-Zehnder interferometer modulator 21-1.

The signal electrode 27A is provided on the straight arm waveguide 25B-1. A desired signal voltage is applied to the signal electrode 27A to provide a potential difference between the signal electrode 27A and the grounding electrodes 27B-1 and 27C-1 so that a desired electric field may be applied to light which propagates in the optical waveguide 25B-1.

Of the grounding electrodes 27B-1 and 27C-1, the grounding electrode 27B-1 is formed to extend into the gap 24-1 so as to form a gap inside grounding electrode 27D. In other words, the grounding electrode 27B-1 (27D) is provided also in the gap 24-1.

The gap inside grounding electrode 27D is formed such that it is spaced by a fixed distance from the straight arm waveguide 25B-1 and covers part of the gap 24-1. Where the gap inside grounding electrode 27D is provided, the amplitude value of the voltage to be applied to the signal electrode 27A in order to obtain a desired optical interference effect as an interferometer can be reduced when compared with an alternative case wherein the gap inside grounding electrode 27D is not provided.

It is to be noted that a buffer layer 21D and a silicon (Si) layer 21E each having a thickness smaller than the thickness of the substrate 21A are stacked between the layer in which the signal electrode 27A and the grounding electrodes 27B-1 and 27C-1 are formed and the layer of the substrate 21A.

The buffer layer 1D is made of, for example, $SiO_2$ and is provided to suppress the absorption loss of light which propagates in the optical waveguide 25 while the silicon layer 1E is provided to uniformize the electric charge distribution in the substrate 21A. The buffer layer 21D and the silicon layer 21E are formed also in the gap 24-1.

In the Mach-Zehnder interferometer modulator 21-1 as an optical device according to the fifth embodiment of the present invention having the configuration described above, light introduced into the optical waveguide 25 is branched into two at the branching point of the Y branching waveguide 25A, propagates in the straight arm waveguides 25B-1 and 2B-2 and joins together at the joining point of the Y branching waveguide 25C, whereafter it is outputted.

In this instance, the light which propagates in the straight arm waveguide 25B-1 is acted upon by a desired electric field with a signal voltage applied to the signal electrode 27A. Consequently, an optical interference effect occurs at the joining point of the Y branching waveguide 25C between the light having propagated in the straight arm waveguide 25B-1 and the light having propagated in the other straight arm waveguide 25B-2. Accordingly, desired output light having undergone optical interference in accordance with the voltage applied to the signal electrode 27A can be obtained.

Further, since the field strength to be applied to the straight arm waveguide 25B-1 can be raised with respect to the voltage applied to the signal electrode 27A by the gap inside grounding electrode 27D, even if the amplitude value of the voltage to be applied to the signal electrode 27A described above is relatively reduced when compared with that in an alternative case wherein the gap inside grounding electrode 27D is not formed, a desired optical interference effect as an interferometer can be obtained.

In this manner, with the Mach-Zehnder interferometer as an optical device according to the fifth embodiment of the present invention, due to the presence of the grounding electrode 27D provided in the gap 24-1, even if the amplitude value of the voltage to be applied to the signal electrode 27A is reduced when compared with that in an alternative case wherein the gap inside grounding electrode 27D is not formed, a desired optical interference effect as an interferometer can be obtained. Therefore, the Mach-Zehnder interferometer is advantageous in that the power consumption required to drive the signal electrode 27A can be reduced and the operation cost of the optical communication system can be reduced and besides the performance as a Mach-Zehnder interferometer can be improved.

e2. First Modification to the Fifth Embodiment

Figures 25A, 25B:
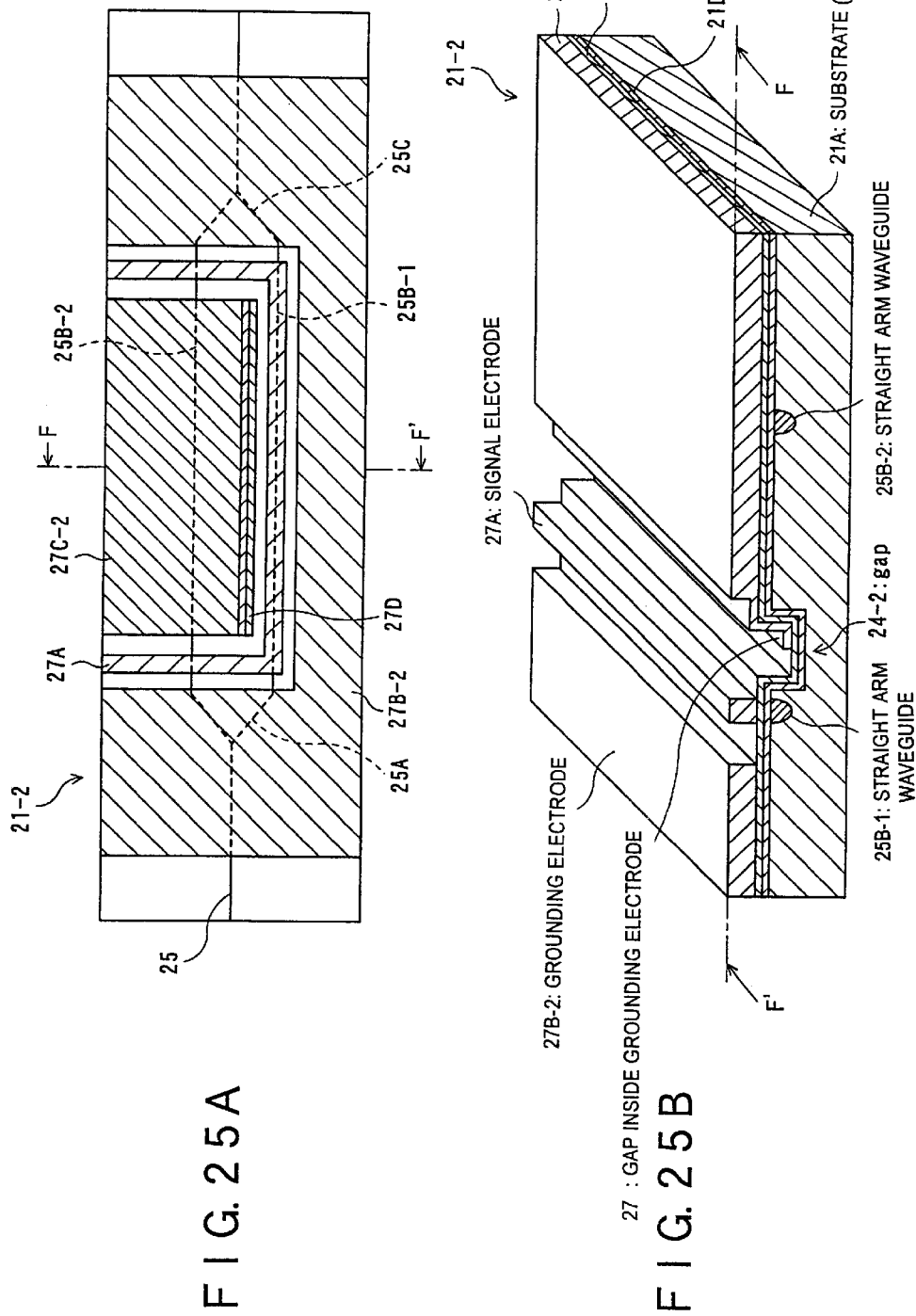
FIG. 25A is a top plan view showing an arrangement configuration of a Mach-Zehnder interferometer according to a first modification to the fifth embodiment.
FIG. 25B is a perspective view showing, partly in section, the Mach-Zehnder interferometer shown in FIG. 25A and particularly showing a cross section taken along line F–F' of FIG. 25A.

FIGS. 25A and 25B show a Mach-Zehnder interferometer modulator 21-2 as an optical device according to a first modification to the fifth embodiment of the present invention. Particularly, FIG. 25A is a top plan view showing an arrangement configuration of the Mach-Zehnder interferometer modulator 21-2, and FIG. 25B is a perspective view showing, partly in section, the Mach-Zehnder interferometer modulator 21-2 shown in FIG. 25A and particularly showing a cross section taken along line F–F' of FIG. 25A.

The Mach-Zehnder interferometer modulator 21-2 of the first modification to the fifth embodiment is different from that of the fifth embodiment described hereinabove with reference to FIGS. 24A and 24B in that a gap 24-2 is provided not on the outer side but on the inner side of the optical waveguide 25 of the Mach-Zehnder interferometer modulator 21-2 and it includes a pair of grounding electrodes 27B-2 and 27C-2 which are different from those in the fifth embodiment. It is to be noted that, in FIGS. 25A and 25B, like reference characters to those in FIGS. 24A and 24B denote like elements.

Here, of the grounding electrodes 27B-2 and 27C-2, the grounding electrode 27C-2 is formed to extend also into the gap 24-2 so as to form a gap inside grounding electrode 27D. In other words, the grounding electrode 27C-2 (27D) is also provided in the gap 24-2.

The gap inside grounding electrode 27D is formed such that it is spaced by a fixed distance from the straight arm waveguide 25B-1 and covers part of the gap 24-2. Where the gap inside grounding electrode 27D is provided, the amplitude value of the necessary voltage to be applied to the signal electrode 27A can be reduced when compared with an alternative case wherein the gap inside grounding electrode 27D is not provided.

In the Mach-Zehnder interferometer modulator 21-2 as an optical device according to the first modification to the fifth embodiment of the present invention having the configuration described above, light introduced into the optical waveguide 25 is branched into two at the branching point of the Y branching waveguide 25A, propagates in the straight arm waveguides 25B-1 and 2B-2 and joins together at the joining point of the Y branching waveguide 25C, whereafter it is outputted.

In this instance, the light which propagates in the straight arm waveguide 25B-1 is acted upon by a desired electric field with a signal voltage applied to the signal electrode 27A. Consequently, an optical interference effect occurs at the joining point of the Y branching waveguide 25C between the light having propagated in the straight arm waveguide 25B-1 and the light having propagated in the other straight arm waveguide 25B-2. Accordingly, desired output light having undergone optical interference in accordance with the voltage applied to the signal electrode 27A can be obtained.

Further, since the field strength to be applied to the straight arm waveguide 25B-1 can be raised with respect to the voltage applied to the signal electrode 27A by the gap inside grounding electrode 27D, even if the amplitude value of the voltage to be applied to the signal electrode 27A is relatively reduced when compared with that in an alternative case wherein the gap inside grounding electrode 27D is not formed, a desired optical interference effect as an interferometer can be obtained.

In this manner, with the Mach-Zehnder interferometer modulator 21-2 as an optical device according to the first modification to the fifth embodiment of the present invention, due to the presence of the grounding electrode 27D provided in the gap 24-2, even if the amplitude value of the voltage to be applied to the signal electrode 27A is reduced when compared with that in an alternative case wherein the gap inside grounding electrode 27D is not formed, a desired optical interference effect as an interferometer can be obtained. Therefore, the Mach-Zehnder interferometer modulator 21-2 is advantageous in that the power consumption required to drive the signal electrode 27A can be reduced and the operation cost of the optical communication system can be reduced, and also the performance as a Mach-Zehnder interferometer modulator can be improved.

e3. Second Modification to the Fifth Embodiment

FIGS. 26A and 26B are schematic views showing a Mach-Zehnder interferometer modulator 21-3 as an optical device according to a second modification to the fifth embodiment of the present invention. Particularly, FIG. 26A is a top plan view showing an arrangement configuration of the Mach-Zehnder interferometer modulator 21-3, and FIG. 26B is a perspective view showing, partly in section, the Mach-Zehnder interferometer modulator 21-3 shown in FIG. 26A and particularly showing a cross section taken along line G–G' of FIG. 26A.

The Mach-Zehnder interferometer modulator 21-3 of the second modification to the fifth embodiment is different from that of the fifth embodiment or the first modification to the fifth embodiment described hereinabove in that a pair of gaps 24-1 and 24-2 are provided along the straight arm waveguide 25B-1 on the outer side and the inner side of the optical waveguide 25 of the Mach-Zehnder interferometer modulator 21-3 and it includes a grounding electrode 27B-1 similar to that in the fifth embodiment and another grounding electrode 27C-2 similar to that in the first modification to the fifth embodiment. It is to be noted that, in FIGS. 26A and 26B, like reference characters to those in FIGS. 24A, 24B, 25A and 25B denote elements that are substantially alike.

Here, the grounding electrodes 27B-1 and 27C-2 are both formed to extend also into the gaps 24-1 and 24-2, respectively, so as to form a pair of gaps inside grounding electrodes 27D. In other words, the grounding electrodes 27B-1 and 27C-2 (27D) are also provided in the gaps 24-1 and 24-2.

The two gaps inside grounding electrodes 27D are formed such that they are spaced by a fixed distance from the straight arm waveguide 25B-1 and cover part of the gaps 24-1 and 24-2, respectively. Where the gaps inside grounding electrodes 27D are provided, the amplitude value of the necessary voltage to be applied to the signal electrode 27A can be reduced when compared with an alternative case wherein the gap inside grounding electrode 27D is not provided.

Further, since the two gaps inside grounding electrodes 27D are formed at symmetrical positions relative to each other with respect to the straight arm waveguide 25B-1 and the signal electrode 27A, also the electric field to be applied to the straight arm waveguide 25B-1 can be formed symmetrically.

In the Mach-Zehnder interferometer modulator 21-3 as an optical device according to the second modification to the fifth embodiment of the present invention having the configuration described above, light introduced into the optical waveguide 25 is branched into two at the branching point of the Y branching waveguide 25A, propagates in the straight arm waveguides 25B-1 and 2B-2 and joins together at the joining point of the Y branching waveguide 25C, whereafter it is outputted.

In this instance, the light which propagates in the straight arm waveguide 25B-1 is acted upon by a desired electric field with a signal voltage applied to the signal electrode 27A. Consequently, an optical interference effect occurs at the joining point of the Y branching waveguide 25C between the light having propagated in the straight arm waveguide 25B-1 and the light having propagated in the other straight arm waveguide 25B-2. Accordingly, desired output light having undergone optical interference in accordance with the voltage applied to the signal electrode 27A can be obtained.

Further, since the field strength to be applied to the straight arm waveguide 25B-1 can be raised with respect to the voltage applied to the signal electrode 27A by the two gaps inside grounding electrodes 27D, even if the amplitude value of the voltage to be applied to the signal electrode 27A is relatively reduced when compared with that in an alternative case wherein the gap inside grounding electrodes 27D are not formed, a desired optical interference effect as an interferometer can be obtained.

In this manner, with the Mach-Zehnder interferometer modulator 21-3 as an optical device according to the second modification to the fifth embodiment of the present invention, due to the presence of the grounding electrodes 27D provided in the gaps 24-1 and 24-2, even if the amplitude value of the voltage to be applied to the signal electrode 27A is reduced when compared with that in an alternative case wherein the gap inside grounding electrodes 27D are not formed, a desired optical interference effect as an interferometer can be obtained. Therefore, the Mach-Zehnder interferometer modulator 21-3 is advantageous in that the power consumption required to drive the signal electrode 27A can be reduced and the operation cost of the optical communication system can be reduced and also the performance as a Mach-Zehnder interferometer modulator can be improved.

f1. Sixth Embodiment FIGS. 27A and 27B show a phase modulator 41-1 as an optical device according to a sixth embodiment of the present invention. Particularly, FIG. 27A is a top plan view showing an arrangement configuration of the phase modulator 41-1, and FIG. 27B is a perspective view showing, partly in section, the phase modulator 41-1 shown in FIG. 27A and particularly showing a cross section taken along line H–H' of FIG. 27A.

The phase modulator 41-1 is used, for example, with an optical communication system similarly to the embodiments described hereinabove and includes, as shown in FIGS. 27A and 27B, a substrate 41A, an optical waveguide 45, a groove (gap) 44-1, a signal electrode 47A, and a grounding electrode 47C. Thus, the phase modulator 41-1 applies a signal voltage for phase modulation through the signal electrode 47A to vary the refraction ratio in the optical waveguide 45 to apply phase modulation to light which propagates in the optical waveguide 45.

Referring to FIG. 27B, the substrate 41A has an electro-optical effect and may be made of, for example, $LiNbO_3$. The optical waveguide 45 is formed as a linear waveguide on the surface of the substrate 41A.

The gap 44-1 is provided on the surface of the substrate 41A in the proximity of the optical waveguide 25. More particularly, the gap 44-1 is formed on one side of the optical waveguide 45 and extends in parallel to the optical waveguide 45.

The signal electrode 47A is provided on the optical waveguide 45. A desired signal voltage is applied to the signal electrode 47A to provide a potential difference between the signal electrode 47A and the grounding electrode 47C so that a desired electric field for varying the refraction index may be applied to light which propagates in the optical waveguide 45.

The grounding electrode 47C is formed to extend also into the gap 44-1 so as to form a gap inside grounding electrode 47D. In other words, the grounding electrode 47C (47D) is provided also in the gap 44-1.

The gap inside grounding electrode 47D is formed such that it is spaced by a fixed distance from the optical waveguide 45 and covers part of the gap 44-1. Where the gap inside grounding electrode 47D is provided, when the phase modulator 41-1 applies desired phase modulation to light which propagates in the optical waveguide 45, the amplitude value of the voltage to be applied to the signal electrode 47A can be reduced when compared with an alternative case wherein the gap inside grounding electrode 47D is not provided.

It is to be noted that a buffer layer 41D and a silicon layer (Si) layer 41E each having a thickness smaller than the thickness of the substrate 41A are stacked between the layer in which the signal electrode 47A and the grounding electrode 47C described above are formed and the layer of the substrate 41A.

The buffer layer 1D is made of, for example, $SiO_2$ similarly to that (refer to reference character 21D) in the fifth embodiment described hereinabove and is provided for suppressing the absorption loss of light which propagates in the optical waveguide 45. The buffer layer 41D and the silicon layer 41E are also formed in the gap 44-1.

In the phase modulator 41-1 as an optical device according to the sixth embodiment of the present invention having the configuration described above, light introduced into the optical waveguide 45 is subject to desired phase modulation by the optical waveguide 45 whose refraction factor is varied by a signal voltage applied to the signal electrode 47A. Then, the phase modulated light is outputted from the phase modulator 41-1.

Since the field strength to be applied to the optical waveguide 45 can be raised with respect to the voltage applied to the signal electrode 47A by the gap inside grounding electrode 47D, even if the amplitude value of the voltage to be applied to the signal electrode 47A is reduced when compared with that in an alternative case wherein the gap inside grounding electrode 47D is not formed, a desired phase modulation effect as the phase modulator 41-1 can be obtained.

In this manner, with the phase modulator 41-1 as an optical device according to the sixth embodiment of the present invention, due to the presence of the grounding electrode 47D provided in the gap 44-1, even if the amplitude value of the voltage to be applied to the signal electrode 47A is reduced when compared with that in an alternative case wherein the gap inside grounding electrode 47D is not formed, a desired phase modulation effect as the phase modulator 41-1 can be obtained. Therefore, the phase modulator 41-1 is advantageous in that the power consumption required to drive the signal electrode 47A can be reduced, the operation cost of the optical communication system can be reduced, and the performance as a phase modulator can be improved.

f2. First Modification to the Sixth Embodiment

Figure 28A:
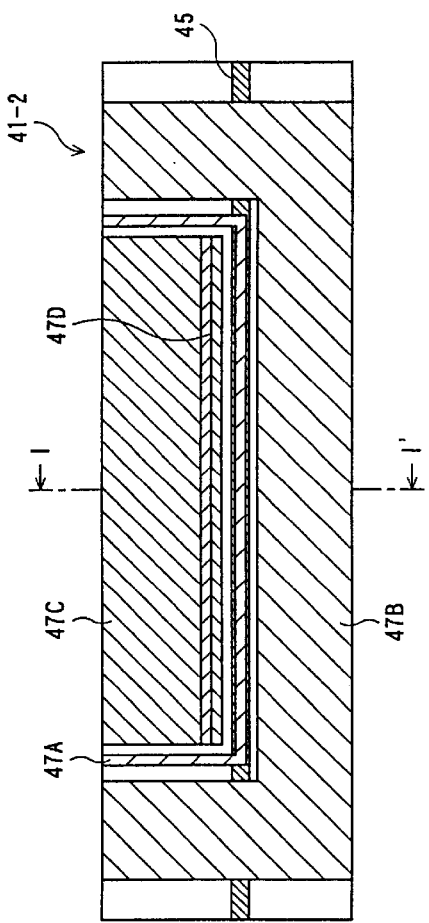
FIG. 28A is a top plan view showing an arrangement configuration of a phase modulator according to a first modification of the sixth embodiment.
Figure 28B:
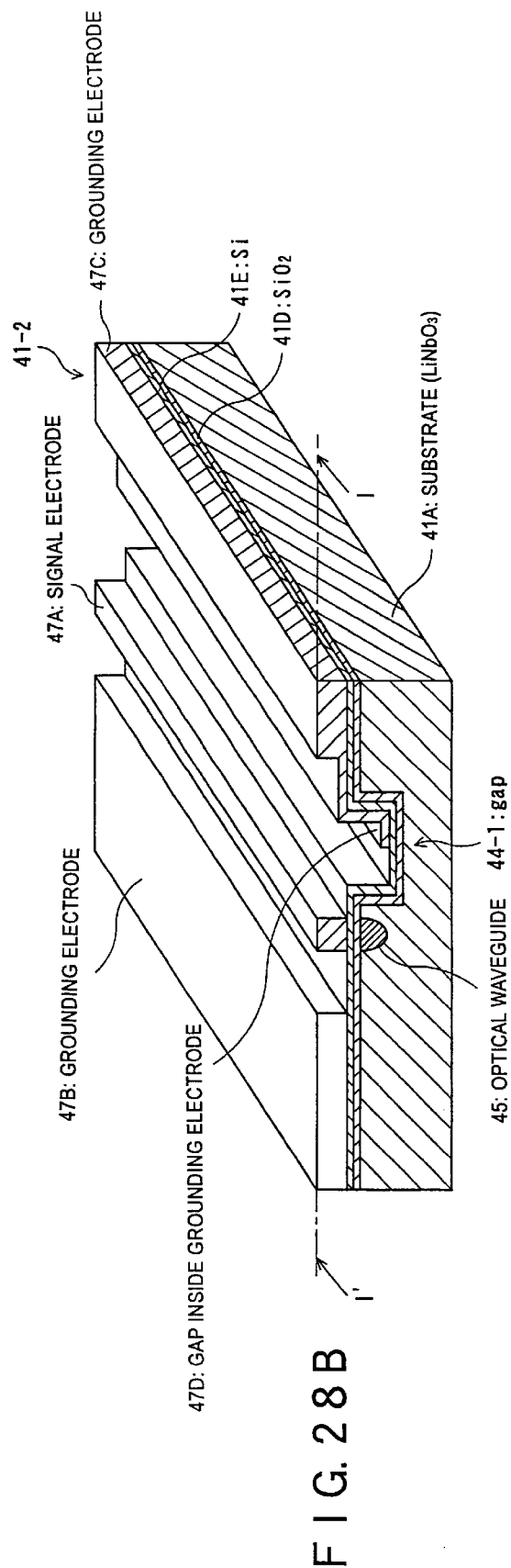
FIG. 28B is a perspective view showing, partly in section, the phase modulator shown in FIG. 28A and particularly showing a cross section taken along line I–I' of FIG. 28A.

FIGS. 28A and 28B are schematic views showing a phase modulator 41-2 as an optical device according to a first modification to the fifth embodiment of the present invention. Particularly, FIG. 28A is a top plan view showing an arrangement configuration of the phase modulator 41-2, and FIG. 28B is a perspective view showing, partly in section, the phase modulator 41-2 shown in FIG. 28A and particularly showing a cross section taken along line I–I' of FIG. 28A.

The phase modulator 41-2 has a configuration substantially similar to but different from the phase modulator 41-1 (refer to FIGS. 27A and 27B) described hereinabove in that it includes a grounding electrode 47B in addition to the grounding electrode 47C. It is to be noted that, in FIGS. 28A and 28B, like reference characters to those in FIGS. 27A and 27B denote like elements.

The gap 44-1 is provided on the surface of the substrate 41A in the proximity of the optical waveguide 45. More particularly, the gap 44-1 is formed on one side of the optical waveguide 45 and extends in parallel to the optical waveguide 45. Further, the grounding electrode 47C is formed to extend also into the gap 44-1 so as to form a gap inside grounding electrode 47D. In other words, the grounding electrode 47C (47D) is also provided in the gap 44-1.

The grounding electrode 47B is provided on the opposite side to the gap 44-1 with respect to the optical waveguide 45. The grounding electrode 47B and the grounding electrode 47C described above are located in a spaced relationship by a predetermined distance from and on the opposite sides of the signal electrode 47A to form a coplanar electrode structure.

In the phase modulator 41-2 as an optical device according to the first modification to the sixth embodiment of the present invention having the configuration described above, light introduced into the optical waveguide 45 is subject to desired phase modulation by the optical waveguide 45 whose refraction factor is varied by a signal voltage applied to the signal electrode 47A. Then, the phase modulated light is outputted from the phase modulator 41-2.

Further, since the field strength to be applied to the optical waveguide 45 can be raised with respect to the voltage applied to the signal electrode 47A by the gap inside grounding electrode 47D, even if the amplitude value of the voltage to be applied to the signal electrode 47A is relatively reduced when compared with that in an alternative case wherein the gap inside grounding electrode 47D is not formed, a desired phase modulation effect as the phase modulator 41-2 can be obtained.

In this manner, with the phase modulator 41-2 as an optical device according to the first modification to the sixth embodiment of the present invention, due to the presence of the grounding electrode 47D provided in the gap 44-1, even if the amplitude value of the voltage to be applied to the signal electrode 47A is reduced when compared with that in an alternative case wherein the gap inside grounding electrode 47D is not formed, a desired phase modulation effect as the phase modulator 41-2 can be obtained. Therefore, the phase modulator 41-2 is advantageous in that the power consumption required to drive the signal electrode 47A can be reduced, operation cost of the optical communication system can be reduced, and the performance as a phase modulator can be improved.

f3. Second Modification to the Sixth Embodiment

Figures 29A, 29B:
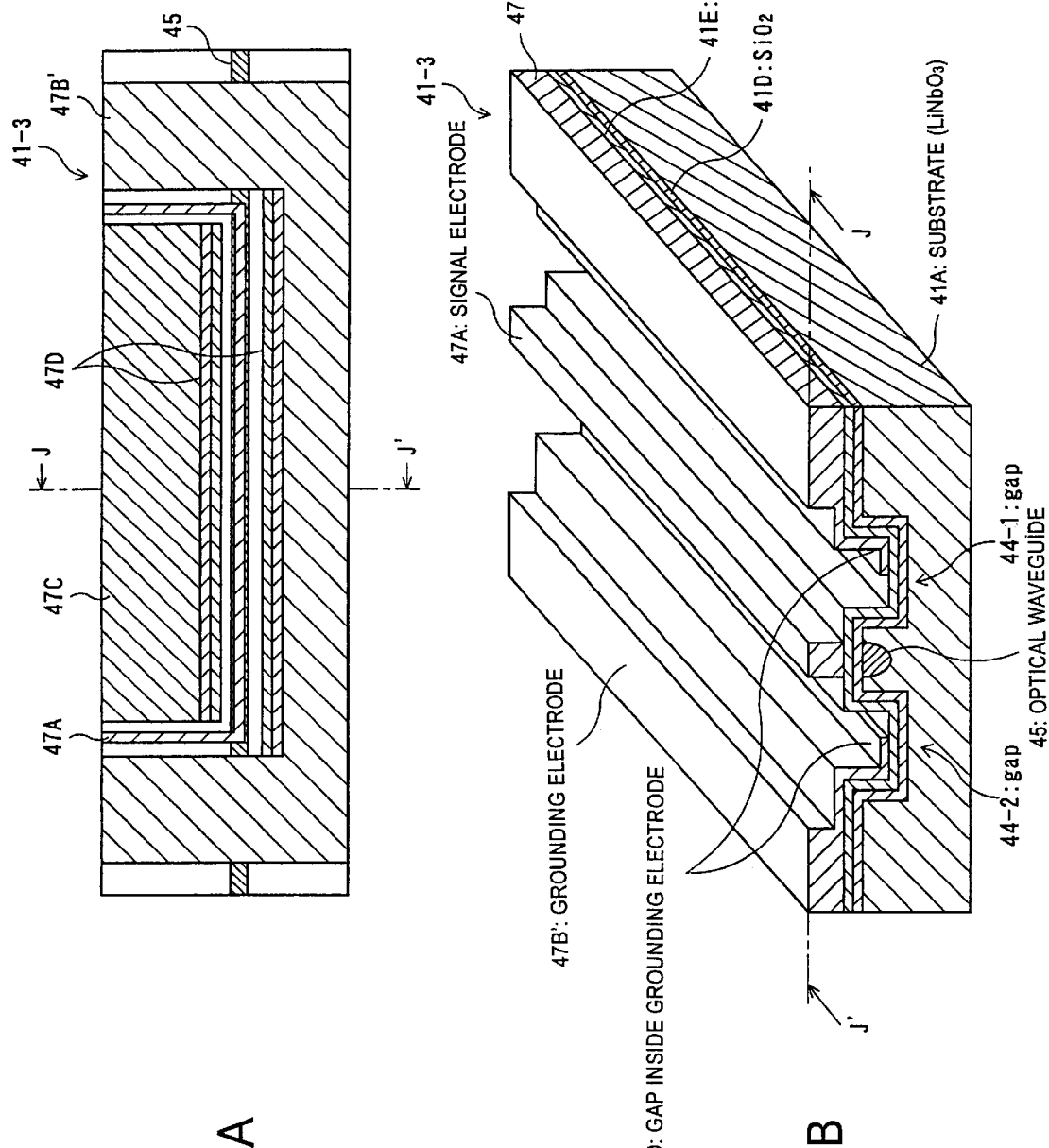
FIG. 29A is a top plan view showing an arrangement configuration of a phase modulator according to a second modification to the fifth embodiment.
FIG. 29B is a perspective view showing, partly in section, the phase modulator shown in FIG. 29A and particularly showing a cross section taken along line J–J' of FIG. 29A.

FIGS. 29A and 29B are schematic views showing a phase modulator 41-3 as an optical device according to a second modification to the sixth embodiment of the present invention. Particularly, FIG. 29A is a top plan view showing an arrangement configuration of the phase modulator 41-3, and FIG. 29B is a perspective view showing, partly in section, the phase modulator 41-3 shown in FIG. 29A and particularly showing a cross section taken along line J–J' of FIG. 29A.

The phase modulator 41-3 is different from the phase modulator 41-2 (refer to FIGS. 28A and 28B) described hereinabove in that a pair of gaps 44-1 and 44-2 are provided on the opposite sides of and extend in parallel to the optical waveguide 45 on the surface of the substrate 1A and that not only the grounding electrode 47C extends into the gap 44-1 but also another grounding electrode 47B' extends into the gap 44-2.

It is to be noted that the phase modulator 41-3 is configured substantially similarly to the phase modulator 41-2 except the two points described just above. It is also to be noted that, in FIGS. 29A and 29B, like reference characters to those in FIGS. 28A, 28B, 27A and 27B denote substantially like elements.

The gaps 44-1 and 44-2 are provided on the surface of the substrate 41A in the proximity of the optical waveguide 45. More particularly, the gaps 44-1 and 44-2 are formed at symmetrical positions with respect to the optical waveguide 45 and extend in parallel to the optical waveguide 45.

Further, the grounding electrode 47B' is formed to extend also into the gap 44-2 so as to form a gap inside grounding electrode 47D. Similarly, the grounding electrode 47C is also formed to extend into the gap 44-1 so as to form a gap inside grounding electrode 47D. In other words, the grounding electrodes 47B' and 47C (47D) are provided also in the gaps 44-2 and 44-1, respectively.

It is to be noted that, similarly to the phase modulator 41-2 described hereinabove with reference to FIGS. 28A and 28B, the grounding electrode 47B' and the grounding electrode 47C described above are located in a spaced relationship by a predetermined distance from and on the opposite sides of the signal electrode 47A to form a coplanar electrode structure.

In the phase modulator 41-3 as an optical device according to the second modification to the sixth embodiment of the present invention having the configuration described above, light introduced into the optical waveguide 45 is subject to desired phase modulation by the optical waveguide 45 whose refraction factor is varied by a signal voltage applied to the signal electrode 47A. Then, the phase modulated light is outputted from the phase modulator 41-3.

Further, since the field strength to be applied to the optical waveguide 45 can be raised with respect to the voltage applied to the signal electrode 47A by the two gap inside grounding electrodes 47D in the gaps 44-1 and 44-2, even if the amplitude value of the voltage to be applied to the signal electrode 47A is relatively reduced when compared with that in an alternative case wherein the gap inside grounding electrodes 47D are not formed, a desired phase modulation effect as the phase modulator 41-2 can be obtained.

In this manner, with the phase modulator 41-3 as an optical device according to the second modification to the sixth embodiment of the present invention, due to the presence of the two grounding electrodes 47D provided in the gaps 44-1 and 44-2, even if the amplitude value of the voltage to be applied to the signal electrode 47A is reduced when compared with that in an alternative case wherein the gap inside grounding electrodes 47D are not formed, a desired phase modulation effect as the phase modulator 41-3 can be obtained. Therefore, the phase modulator 41-3 is advantageous in that the power consumption required to drive the signal electrode 47A can be reduced and the operation cost of the optical communication system can be reduced and besides the performance as a phase modulator can be improved.

g. Others

Figure 18:
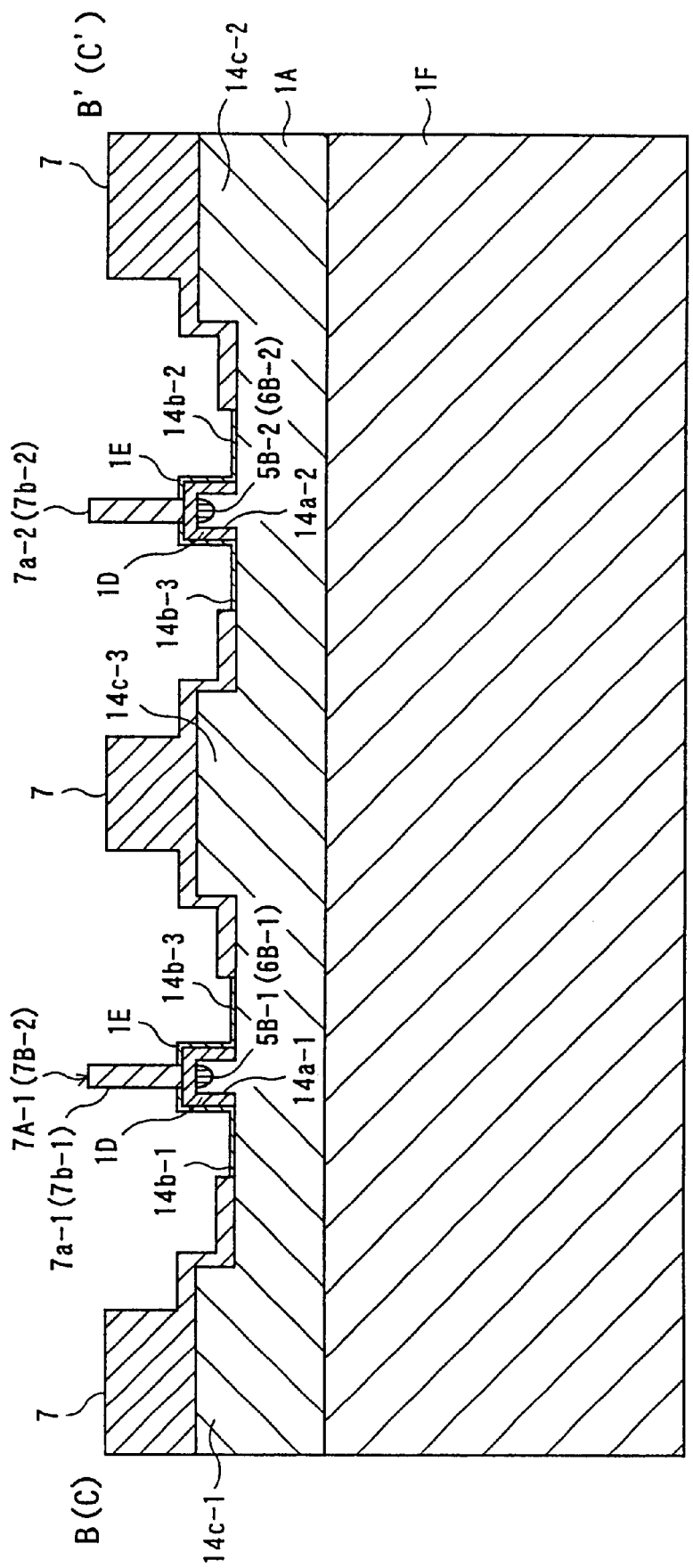
FIGS. 18 to 21 are schematic views showing sectional structures of the optical devices according to modifications to the different embodiments of the present invention.

It is to be noted that, in the first to fourth embodiments described hereinabove, the buffer layer 1D and the silicon film 1E are formed over the entire area of the substrate 1A between the substrate 1A and the first and second electrodes 7A-1 and 7B-1 (such that they extend along the shapes of the first groove 14b-1, the second groove 14b-2 and the third groove 14b-3). However, according to the present invention, for example, as shown in FIG. 18, a buffer layer 1D' may be provided only between the substrate 1A at least at portions on the surface thereof at which the optical waveguides 5 and 6 are formed and the first and second electrodes 7A-1 and 7B-1. Also the buffer layer 1D' formed in this manner can suppress at least the absorption loss of light which propagates in the optical waveguides 5 and 6.

Further, as shown in FIG. 18, a silicon film 1E' may be formed only at a portion at which no signal electrode is formed and no grounding electrode is formed (that is, part of the grooves 14b-1 to 14b-3 and the ridges 14a-1 and 14a-2 shown in FIG. 18). Also the silicon film 1E' formed in this manner can uniformize at least the electric charge distribution in the substrate 1A.

Figure 19:
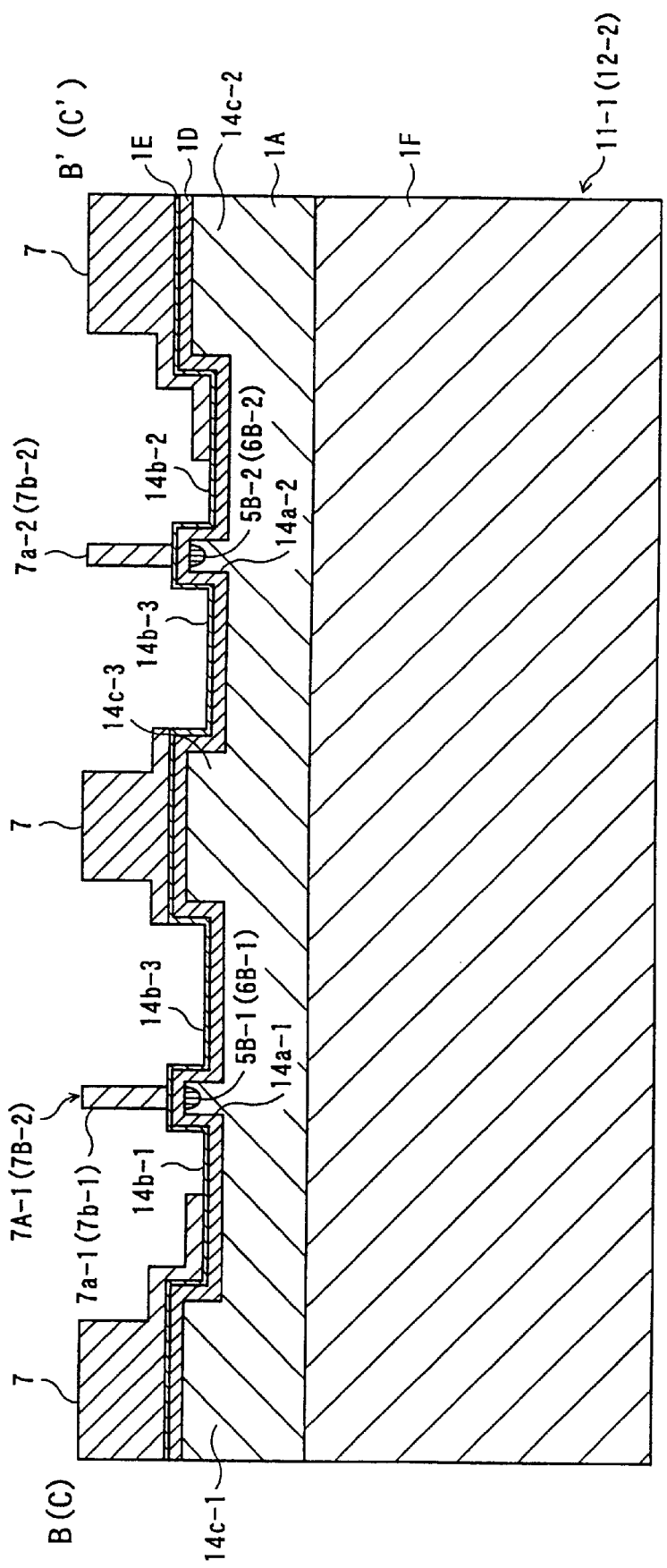

Furthermore, in the first to fourth embodiments described hereinabove, the grounding electrode 7 extends to the first groove 14b-1 adjacent to the first bank 14c-1, the second groove 14b-2 adjacent to the second bank 14c-2, and the third groove 14b-3 adjacent to the opposite sides of the third bank 14c-3. However, according to the present invention, it is possible to form the grounding electrode 7 such that, for example, as shown in FIG. 19, it extends to the first groove 14b-1 and the second groove 14b-2 but does not extend to the third groove 14b-3.

In other words, if the grounding electrode 7 extends at least to the first and second grooves 14b-1 and 14b-2 on the first and second banks 14c-1 and 14c-2, then the grounding electrode 7 formed on the third bank 14c-3 may be formed such that it does not extend to the third groove 14b-3 on the opposite sides of the third bank 14c-3. Also where the grounding electrode 7 is formed in this manner, since at least the drive voltage can be reduced, there is an advantage that the performance as an optical modulator can be improved.

Figure 20:
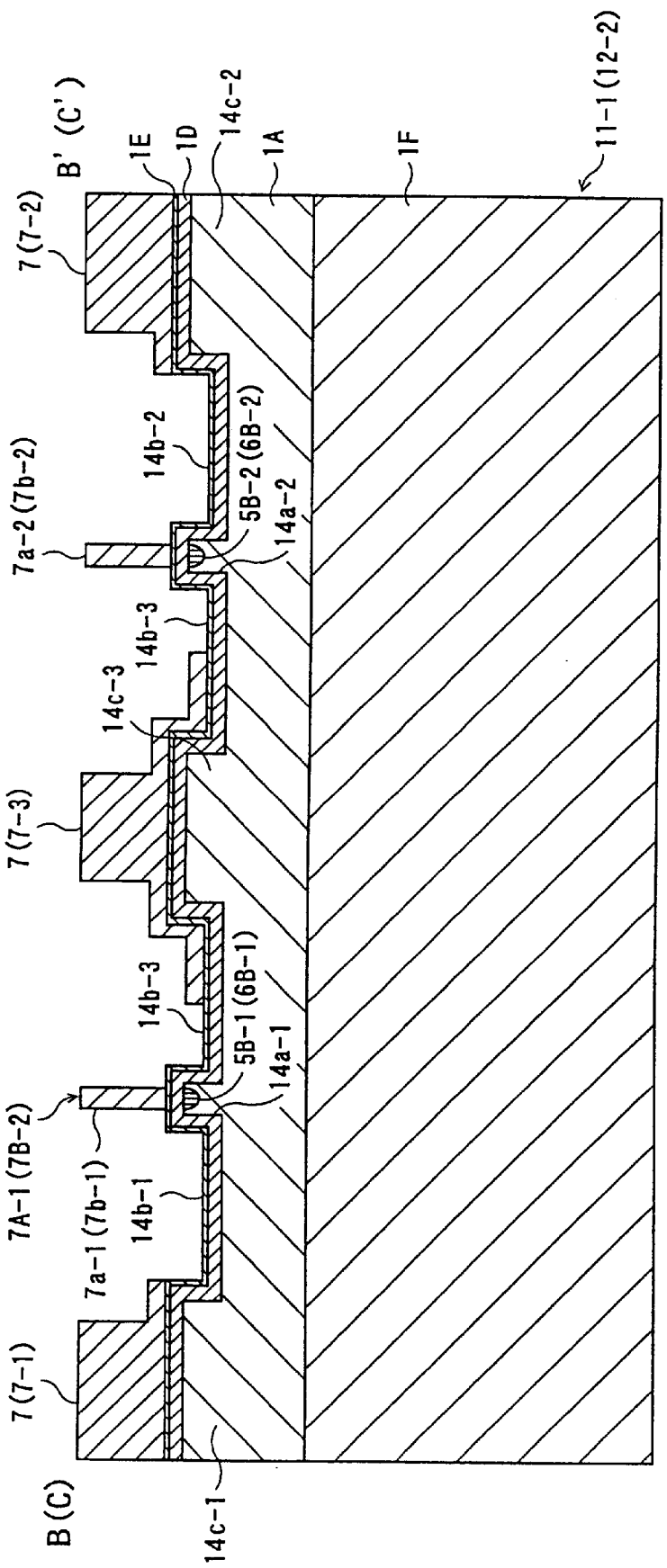

Further, according to the present invention, it is possible to form the grounding electrode 7 such that, for example, as shown in FIG. 20, it extends to the third groove 14b-3 but does not extend to the first groove 14b-1 or the second groove 14b-2.

In particular, the grounding electrode 7 may be formed such that, only if it extends at least to the third groove 14b-3 on the opposite sides of the third bank 14c-3, then the grounding electrode 7 on the first and second banks 14c-1 and 14c-2 need not extend to any of the first and second grooves 14b-1 and 14b-2. Also where the grounding electrode 7 is formed in this manner, since at least the drive voltage can be reduced, there is an advantage that the performance as an optical modulator can be improved.

Figure 21:
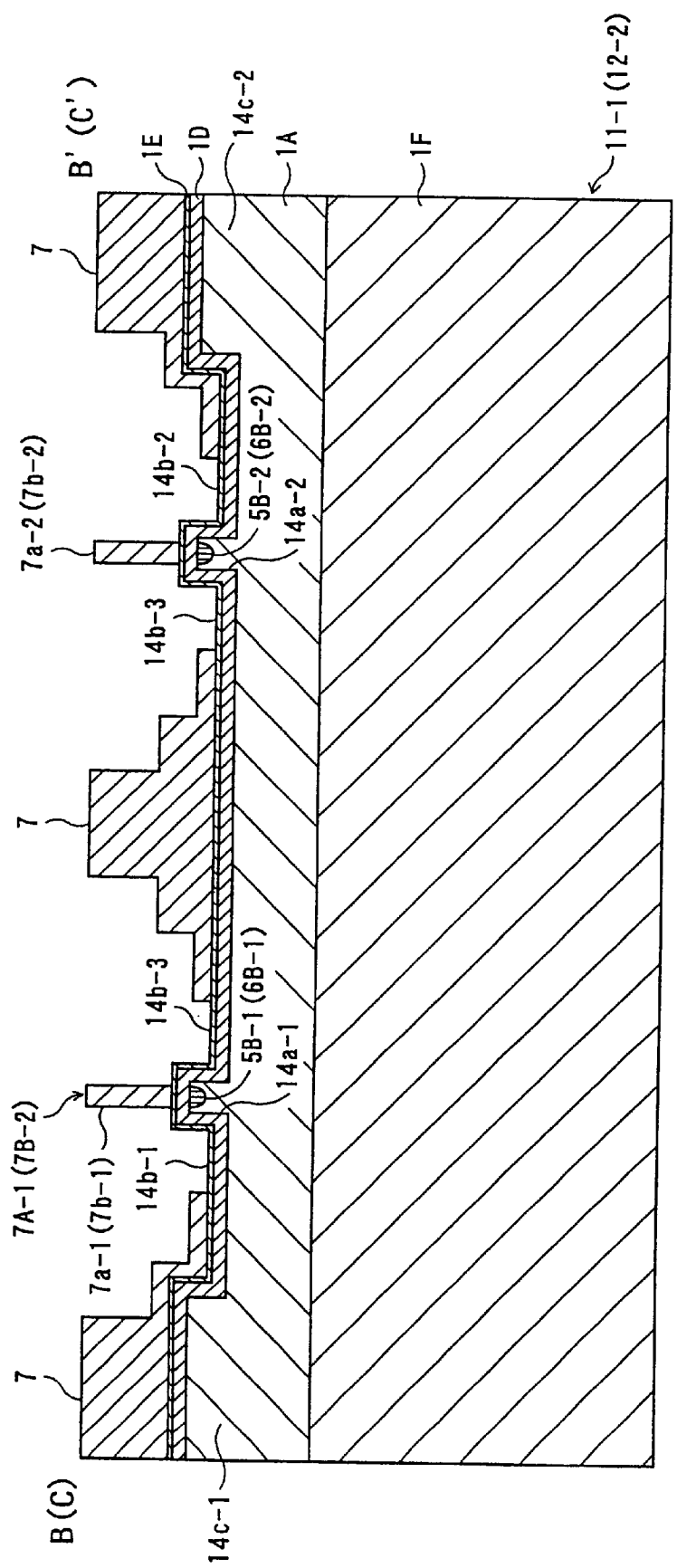

Further, in the first to fourth embodiments described above, the third bank 14c-3 is formed at a middle position between the first ridge 14a-1 and the second ridge 14a-2 in the third groove 14b-3 and the grounding electrode 7 extends to the third groove 14b-3 on the opposite sides of and adjacent to the third bank 14c-3. However, according to the present invention, the formation of the grounding electrode 7 is not limited to this, and it is otherwise possible, for example, to form the grounding electrode 7 at a middle position of the third groove 14b-3 without forming the third bank 14c-3 as shown in FIG. 21.

In particular, the grounding electrode 7 may be formed at a middle position of the third groove 14b-3 without forming the third bank 14c-3 only if at least the grounding electrode 7 on the first and second banks 14c-1 and 14c-2 extends to the first and second grooves 14b-1 and 14b-2, respectively. Also where the grounding electrode 7 is formed in this manner, since at least the drive voltage can be reduced, there is an advantage that the performance as an optical modulator can be improved.

In this instance, while the ridges 14a-1 and 14a-2 and the banks 14c-1 and 14c-2 are formed by digging the grooves 14b-1 to 14b-3 described above, the grooves 14b-1 to 14b-3 can be dug to the same width and the top face levels of the ridges 14a-1 and 14a-2 and the top face levels of the banks 14c-1 and 14c-2 can be set to a substantially same level.

Further, the optical devices 1 to 3 according to the first to third embodiments described above are formed by integration of optical modulators of the clock modulation type as a unitary member. However, according to the present invention, it is otherwise possible to form an optical modulator for clock modulation and another optical modulator for NRZ data modulation as separate chips so that an optical RZ data signal similar to that obtained as a modulation result from the optical devices 1 to 3 may be obtained.

Furthermore, in the optical devices 1 to 4, 21-1 to 21-3 and 41-1 to 41-3 according to the embodiments of the present invention described hereinabove, a substrate cut in the Z-axis direction of crystal orientation of $LiNbO_3$ is used for the substrate 1A. However, according to the present invention, any other substrate material may be used to form the substrate 1A.

Further, the extending portions of the grounding electrode 7 to the first to third grooves 14b-1 to 14b-3 which are the characteristic elements of the present invention in the first to fourth embodiments described hereinabove are formed such that they extend along the shapes of the grooves and are formed with a substantially uniform thickness. However, according to the present invention, they need not be limited to the specific shapes, and the grounding electrode 7 can be formed such that it has extension shapes different from those in the first to fourth embodiments described hereinabove only if it extends from locations on the banks to the grooves on the ridge side.

Similarly, the gap inside grounding electrode 27D which is a characteristic element of the present invention in the fifth and sixth embodiments described hereinabove extends along the shapes of the gaps 24-1 and 24-2 and is formed with a substantially uniform thickness. However, according to the present invention, the formation of the gap inside grounding electrode 27D is not limited to this, and it is otherwise possible to form the grounding electrode such that it has an extension shape different from those of the fifth and sixth embodiments described hereinabove as far as the grounding electrode is provided at least in a gap.

Furthermore, in the optical modulators having the grounding electrode 7 as a characteristic element of the present invention in the first to fourth embodiments described hereinabove, the straight arm waveguides 5B-1, 5B-2, 6B-1 and 6B-2 have a width of 7 μm, and the signal electrodes 7a-1, 7a-2, 7b-1 and 7b-2 have a contact width We=5 with the ridges 14a-1 and 14a-2. However, the relationship among the width Rw of the ridges 14a-1 and 14a-2, the waveguide width, and the contact width We of the signal electrodes 7a-1, 7a-2, 7b-1 and 7b-2 with the ridges 14a-1 and 14a-2 can be varied within a range within which the balance among the requirement for suppression of the waveguide loss, the requirement for lowering of the drive voltage and the requirement for velocity match between a microwave and light is maintained while the electrode distance Se and the electrode thickness are taken into consideration.

Further, in the first to fourth embodiments described above, an optical modulator which can modulate an optical signal so as to have an information amount of 40 Gb/s is described in detail. However, the present invention can be applied also to an optical modulator which modulates an optical signal so as to have an information amount smaller than 40 Gb/s or an optical modulator which modulates an optical signal so as to have an information amount greater than 40 Gb/s.

Where the optical device according to the present invention is formed as an optical modulator which modulates an optical signal so as to have an information amount smaller than 40 Gb/s as described above, the output light can have a transmission rate of at least approximately 10 Gb/s. In this instance, a clock generator which generates a clock signal frequency of 5 gigahertz is used for the clock generator 8A of the optical devices 1 to 3 described hereinabove with reference to FIGS. 3, 13 and 16, while a clock generator which produces a clock signal frequency of 10 gigahertz is used for the clock generator 8B of the optical modulator 2-1 shown in FIG. 14.

Further, it is naturally possible to use the configurations of the Mach-Zehnder interferometer modulators 21-1 to 21-3 according to the fifth embodiment and modifications to the fifth embodiment described above as an intensity modulator of a single member and also as an electrode structure for such single electrode modulators (refer to reference characters 12-1 and 12-2) as described hereinabove with reference to FIGS. 13, 14 and 16.

Furthermore, each of the phase modulators according to the sixth embodiment and the modifications to the sixth embodiment described hereinabove can be used as a phase modulator of a single unit. However, it may be formed from the same substrate integrally with any of the intensity modulators, for example, of the substrate configurations described hereinabove with reference to FIGS. 3, 13, 14, 16 and 17. In this instance, the phase modulator may be disposed in the preceding stage or the succeeding stage to the intensity modulator or may alternatively be interposed between two intensity modulators.

Further, with regard to the portions of the Mach-Zehnder interferometer modulators 21-1 to 21-3 according to the fifth embodiment and the modifications to the fifth embodiment described above and the phase modulators 41-1 to 41-3 according to the sixth embodiment and the modifications to the sixth embodiment at which the gaps 24-1, 24-2 or 44-1, 44-2 are formed, the formation patterns of the electrodes 27D and 47D in the gaps, the buffer layers 21D and 41D and the silicon layers 21E and 41E may adopt any of such structures of the embodiments and the modifications described above and such structures as described hereinabove with reference to FIGS. 18 to 21.

Furthermore, in the Mach-Zehnder interferometer modulators 21-1 to 21-3 according to the fifth embodiment and the modifications to the fifth embodiment and the phase modulators 41-1 to 41-3 according to the sixth embodiment and the modifications to the sixth embodiment described hereinabove, in order to improve the high frequency characteristic, such a glass plate (refer to reference character 1F) as described hereinabove with reference to FIGS. 1 and 18 to 21 may be adhered to the face of the substrate 41A made of $LiNbO_3$ opposite to the face on which the electrodes are formed.

Further, in the embodiments described hereinabove, the present invention is applied to optical devices particularly in the form of an intensity modulator, a Mach-Zehnder interferometer modulator and a phase modulator. However, the present invention is not limited to the configurations of the optical waveguides and the types of the modulators of the embodiments described hereinabove and can naturally be applied to various optical devices in addition to them.

The present invention is not limited to the embodiments specifically described above, and variations and modifications can be made without departing from the scope of the present invention.

What is claimed is:

1. An optical device, comprising:
   a substrate having an electro-optical effect and having formed thereon first and second ridges which extend in parallel to each other, first and second grooves which are positioned on the outer sides of said first and second ridges, respectively, a third groove which is positioned between said first and second ridges, and first and second banks which are positioned on the outer sides of said first and second grooves, respectively;
   a Mach-Zehnder optical waveguide formed on said substrate such that said Mach-Zehnder optical waveguide branches at a first Y branching waveguide into a first arm waveguide included in said first ridge and a second arm waveguide included in said second ridge and then joins together at a second Y branching waveguide; and electrodes formed on said substrate and including a first signal electrode formed on said first ridge, a second signal electrode formed on said second ridge and a grounding electrode formed on said first and second banks and said third groove for controlling light which propagates in said optical waveguide;

said grounding electrode extending to said first groove adjacent to said first bank and said second groove adjacent to said second bank.

2. The optical device as claimed in claim 1, wherein a third bank is formed at a middle position between said first and second ridges in said third groove.

3. The optical device as claimed in claim 2, wherein said grounding electrode extends to said third groove adjacent to the opposite sides of said third bank.

4. The optical device as claimed in claim 1, wherein said substrate is made of $LiNbO_3$.

5. The optical device as claimed in claim 4, wherein said substrate made of $LiNbO_3$ is Z-axis cut.

6. The optical device as claimed in claim 1, wherein said ridges have a top face level substantially equal to that of said banks.

7. The optical device as claimed in claim 2, wherein said ridges have a top face level substantially equal to that of said banks.

8. The optical device as claimed in claim 1, wherein said grooves have depths set substantially equal to each other.

9. The optical device as claimed in claim 1, wherein said signal electrodes contact with the respective corresponding ridges with a contact width smaller than the width of said ridges.

10. The optical device as claimed in claim 1, wherein a buffer layer is formed between said substrate and said electrodes.

11. The optical device as claimed in claim 10, wherein said buffer layer is formed in such a manner as to trace the shapes of said first, second and third grooves.

12. The optical device as claimed in claim 10, wherein said buffer layer is provided also in said first, second and third grooves and has, in said grooves, a thickness smaller than the thickness of a portion of said buffer layer which is present at any other location.

13. The optical device as claimed in claim 1, wherein another electrode is provided at said second Y branching waveguide.

14. The optical device as claimed in claim 1, wherein an NRZ data signal generator for supplying an NRZ data signal is connected to at least one of said electrodes.

15. The optical device as claimed in claim 13, wherein a DC power supply is connected to the other electrode.

16. The optical device as claimed in claim 1, wherein a pad for external apparatus connection is provided at each end portion of at least one electrode of said electrodes and has a width equal to or smaller than 70 microns.

17. The optical device as claimed in claim 13, wherein a pad for external apparatus connection is provided at each end portion of the another electrode and has a width equal to or smaller than 70 microns.

18. An optical device, comprising:

a Z-axis cut substrate made of $LiNbO_3$ and having formed thereon first and second ridges which extend in parallel to each other, first and second grooves which are positioned on the outer sides of said first and second ridges, respectively, a third groove which is positioned between said first and second ridges, and first and second banks which are positioned on the outer sides of said first and second grooves, respectively;

a Mach-Zehnder optical waveguide formed on said substrate such that said Mach-Zehnder optical waveguide branches at a first Y branching waveguide into a first arm waveguide included in said first ridge and a second arm waveguide included in said second ridge and then joins together at a second Y branching waveguide; and electrodes formed on said substrate and including a first signal electrode formed on said first ridge, a second signal electrode formed on said second ridge and a grounding electrode formed on said first and second banks and said third groove for controlling light which propagates in said optical waveguide;

a buffer layer being formed between said substrate and said electrodes;

said grounding electrode extending to said first groove adjacent to said first bank and said second groove adjacent to said second bank.

19. An optical device, comprising:

a substrate having an electro-optical effect and having formed thereon first and second ridges which extend in parallel to each other, first and second grooves which are positioned on the outer sides of said first and second ridges, respectively, a third groove which is positioned between said first and second ridges, first and second banks which are positioned on the outer sides of said first and second grooves, respectively, and a third bank which is positioned intermediately between said first and second ridges in said third groove in such a manner as to divide said third groove;

a Mach-Zehnder optical waveguide formed on said substrate such that said Mach-Zehnder optical waveguide branches at a first Y branching waveguide into a first arm waveguide included in said first ridge and a second arm waveguide included in said second ridge and then joins together at a second Y branching waveguide; and electrodes formed on said substrate and including a first signal electrode formed on said first ridge, a second signal electrode formed on said second ridge and a grounding electrode formed on said first, second and third banks for controlling light which propagates in said optical waveguide;

said grounding electrode extending to said third groove adjacent to the opposite sides of said third bank.

20. The optical device as claimed in claim 19, wherein said substrate is made of $LiNbO_3$.

21. The optical device as claimed in claim 20, wherein said substrate made of $LiNbO_3$ is Z-axis cut.

22. The optical device as claimed in claim 19, wherein said ridges have a top face level substantially equal to that of said banks.

23. The optical device as claimed in claim 19, wherein said grooves have depths set substantially equal to each other.

24. The optical device as claimed in claim 19, wherein said signal electrodes contact with the respective corresponding ridges with a contact width smaller than the width of said ridges.

25. The optical device as claimed in claim 19, wherein a buffer layer is formed between said substrate and said electrodes.

26. The optical device as claimed in claim 25, wherein said buffer layer is formed in such a manner as to trace the shapes of said first, second and third grooves.

27. The optical device as claimed in claim 26, wherein said buffer layer is provided also in said first, second and third grooves and has, in said grooves, a thickness smaller than the thickness of a portion of said buffer layer which is present at any other location.

28. The optical device as claimed in claim 19, wherein another electrode is provided at said second Y branching waveguide.

29. The optical device as claimed in claim 19, wherein an NRZ data signal generator for supplying an NRZ data signal is connected to at least one electrode of said electrodes.

30. The optical device as claimed in claim 28, wherein a DC power supply is connected to the other electrode.

31. The optical device as claimed in claim 19, wherein a pad for external apparatus connection is provided at each end portion of at least one electrode of said electrodes and has a width equal to or smaller than 70 microns.

32. The optical device as claimed in claim 28, wherein a pad for external apparatus connection is provided at each end portion of the other electrode and has a width equal to or smaller than 70 microns.

33. An optical device, comprising:
a Z-axis cut substrate made of $LiNbO_3$ and having formed thereon first and second ridges which extend in parallel to each other, first and second grooves which are positioned on the outer sides of said first and second ridges, respectively, a third groove which is positioned between said first and second ridges, first and second banks which are positioned on the outer sides of said first and second grooves, respectively, and a third bank which is positioned intermediately between said first and second ridges in said third groove in such a manner as to divide said third groove;
a Mach-Zehnder optical waveguide formed on said substrate such that said Mach-Zehnder optical waveguide branches at a first Y branching waveguide into a first arm waveguide included in said first ridge and a second arm waveguide included in said second ridge and then joins together at a second Y branching waveguide; and
electrodes formed on said substrate and including a first signal electrode formed on said first ridge, a second signal electrode formed on said second ridge and a grounding electrode formed on said first, second and third banks for controlling light which propagates in said optical waveguide;
a buffer layer being formed between said substrate and said electrodes;
said grounding electrode extending to said first groove adjacent said first bank, said second groove adjacent said second bank and said third groove adjacent to the opposite sides of said third bank.

34. An optical device, comprising:
a Mach-Zehnder first optical modulator including a first substrate having an electro-optical effect, a Mach-Zehnder first optical waveguide formed on said first substrate, and first electrode means formed on said first substrate for controlling light which propagates in said first optical waveguide;
a Mach-Zehnder second optical modulator connected in cascade connection to said Mach-Zehnder first optical modulator and including a second substrate having an electro-optical effect, a Mach-Zehnder second optical waveguide formed on said second substrate and connected to said first optical waveguide, and second electrode means formed on said second substrate for controlling light which propagates in said second optical waveguide;
a clock generator connected to a first one of said first and second electrode means for applying a clock signal to the first one of said first and second electrode means to produce an RZ signal; and
an NRZ data signal generator connected to a second one of said first and second electrode means for supplying an NRZ data signal to the second one of said first and second electrode means;
at least one of said Mach-Zehnder first optical modulator and said Mach-Zehnder second optical modulator being formed as an optical device having the characteristics of claim 1.

35. The optical device as claimed in claim 34, wherein said first and second substrates are formed from a common substrate, and said Mach-Zehnder first optical modulator and said Mach-Zehnder second optical modulator are integrated as a unitary member.

36. The optical device as claimed in claim 34, wherein said substrate is made of $LiNbO_3$.

37. The optical device as claimed in claim 36, wherein said substrate made of $LiNbO_3$ is Z-axis cut.

38. The optical device as claimed in claim 35, wherein one of said Mach-Zehnder first optical modulator and said Mach-Zehnder second optical modulator is formed as an optical device having the characteristics of claim 1 while said electrode means of the other of said Mach-Zehnder first optical modulator and said Mach-Zehnder second optical modulator includes a signal electrode and a grounding electrode, and the grounding electrodes of said Mach-Zehnder first optical modulator and said Mach-Zehnder second optical modulator are formed as a common grounding electrode.

39. The optical device as claimed in claim 34, wherein one of said Mach-Zehnder first optical modulator and said Mach-Zehnder second optical modulator is formed as an optical device having the characteristics of claim 1 while said electrode means of the other of said Mach-Zehnder first optical modulator and said Mach-Zehnder second optical modulator is formed as a dual electrode having two signal electrodes.

40. The optical device as claimed in claim 34, wherein one of said Mach-Zehnder first optical modulator and said Mach-Zehnder second optical modulator is formed as an optical device having the characteristics of claim 1 while said electrode means of the other of said Mach-Zehnder first optical modulator and said Mach-Zehnder second optical modulator is formed as a single electrode having a single signal electrode.

41. The optical device as claimed in claim 34, wherein said clock generator applies a clock signal of a frequency equal to one half the transmission rate of output light of said optical device per unit time to one of said first and second electrodes to produce an RZ signal of a transmission rate equal to the transmission rate of output light of said optical device per unit time.

42. The optical device as claimed in claim 41, wherein the transmission rate of output light of said optical device per unit time is at the lowest higher than 10 gigabits per second and the clock signal has a frequency equal to or higher than 5 gigahertz.

43. The optical device as claimed in claim 34, wherein said clock generator applies a clock signal of a frequency equal to the transmission rate of output light of said optical device per unit time to one of said first and second electrodes to produce an RZ signal of a transmission rate equal to the transmission rate of output light of said optical device per unit time.

44. The optical device as claimed in claim 43, wherein the transmission rate of output light of said optical device per unit time is at the lowest higher than 10 gigabits per second and the clock signal has a frequency equal to or higher than 10 gigahertz.

45. The optical device as claimed in claim 38, wherein said grounding electrode has a cutaway portion formed therein on a connection path between said Mach-Zehnder first optical modulator and said Mach-Zehnder second optical modulator.

46. The optical device as claimed in claim 38, wherein light loss reduction means for reducing the loss of light propagated is formed on a connection path between said Mach-Zehnder first optical modulator and said Mach-Zehnder second optical modulator.

47. An optical device, comprising:
   a Mach-Zehnder first optical modulator including a first substrate having an electro-optical effect, a Mach-Zehnder first optical waveguide formed on said first substrate, and first electrode means formed on said first substrate for controlling light which propagates in said first optical waveguide;
   a Mach-Zehnder second optical modulator connected in cascade connection to said Mach-Zehnder first optical modulator and including a second substrate having an electro-optical effect, a Mach-Zehnder second optical waveguide formed on said second substrate and connected to said first optical waveguide, and second electrode means formed on said second substrate for controlling light which propagates in said second optical waveguide;
   a clock generator connected to a first one of said first and second electrode means for applying a clock signal to the first one of said first and second electrode means to produce an RZ signal; and
   an NRZ data signal generator connected to a second one of said first and second electrode means for supplying an NRZ data signal to the second one of said first and second electrode means;
   at least one of said Mach-Zehnder first optical modulator and said Mach-Zehnder second optical modulator being formed as an optical device having the characteristics of claim 19.

48. The optical device as claimed in claim 47, wherein said first and second substrates are formed from a common substrate, and said Mach-Zehnder first optical modulator and said Mach-Zehnder second optical modulator are integrated as a unitary member.

49. The optical device as claimed in claim 47, wherein said substrate is made of $LiNbO_3$.

50. The optical device as claimed in claim 49, wherein said substrate made of $LiNbO_3$ is Z-axis cut.

51. The optical device as claimed in claim 48, wherein one of said Mach-Zehnder first optical modulator and said Mach-Zehnder second optical modulator is formed as an optical device having the characteristics of claim 19 while said electrode means of the other of said Mach-Zehnder first optical modulator and said Mach-Zehnder second optical modulator includes a signal electrode and a grounding electrode, and the grounding electrodes of said Mach-Zehnder first optical modulator and said Mach-Zehnder second optical modulator are formed as a common grounding electrode.

52. The optical device as claimed in claim 47, wherein one of said Mach-Zehnder first optical modulator and said Mach-Zehnder second optical modulator is formed as an optical device having the characteristics of claim 19 while said electrode means of the other of said Mach-Zehnder first optical modulator and said Mach-Zehnder second optical modulator is formed as a dual electrode having two signal electrodes.

53. The optical device as claimed in claim 47, wherein one of said Mach-Zehnder first optical modulator and said Mach-Zehnder second optical modulator is formed as an optical device having the characteristics of claim 19 while said electrode means of the other of said Mach-Zehnder first optical modulator and said Mach-Zehnder second optical modulator is formed as a single electrode having a single signal electrode.

54. The optical device as claimed in claim 47, wherein said clock generator applies a clock signal of a frequency equal to one half the transmission rate of output light of said optical device per unit time to one of said first and second electrodes to produce an RZ signal of a transmission rate equal to the transmission rate of output light of said optical device per unit time.

55. The optical device as claimed in claim 54, wherein the transmission rate of output light of said optical device per unit time is at the lowest higher than 10 gigabits per second and the clock signal has a frequency equal to or higher than 5 gigahertz.

56. The optical device as claimed in claim 47, wherein said clock generator applies a clock signal of a frequency equal to the transmission rate of output light of said optical device per unit time to one of said first and second electrodes to produce an RZ signal of a transmission rate equal to the transmission rate of output light of said optical device per unit time.

57. The optical device as claimed in claim 56, wherein the transmission rate of output light of said optical device per unit time is at the lowest higher than 10 gigabits per second and the clock signal has a frequency equal to or higher than 10 gigahertz.

58. The optical device as claimed in claim 47, wherein said grounding electrode has a cutaway portion formed therein on a connection path between said Mach-Zehnder first optical modulator and said Mach-Zehnder second optical modulator.

59. The optical device as claimed in claim 47, wherein light loss reduction means for reducing the loss of light propagated is formed on a connection path between said Mach-Zehnder first optical modulator and said Mach-Zehnder second optical modulator.

* * * * *